(12) United States Patent
Narushima et al.

(10) Patent No.: US 12,474,774 B2
(45) Date of Patent: Nov. 18, 2025

(54) VEHICLE DISPLAY DEVICE

(71) Applicant: YAZAKI CORPORATION, Tokyo (JP)

(72) Inventors: Noriaki Narushima, Susono (JP); Takenobu Tomihira, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/672,004

(22) Filed: May 23, 2024

(65) Prior Publication Data

US 2024/0308338 A1 Sep. 19, 2024

Related U.S. Application Data

(62) Division of application No. 17/572,562, filed on Jan. 10, 2022, now abandoned.

(30) Foreign Application Priority Data

Jan. 12, 2021 (JP) .................................. 2021-002499

(51) Int. Cl.
| | |
|---|---|
| *B60K 35/23* | (2024.01) |
| *B60K 35/22* | (2024.01) |
| *B60K 35/81* | (2024.01) |
| *G06F 3/01* | (2006.01) |
| *B60K 35/10* | (2024.01) |

(52) U.S. Cl.
CPC .............. *G06F 3/013* (2013.01); *B60K 35/22* (2024.01); *B60K 35/23* (2024.01); *B60K 35/81* (2024.01);

(Continued)

(58) Field of Classification Search
None
See application file for complete search history.

(56) References Cited

U.S. PATENT DOCUMENTS

| 9,766,455 B2 * | 9/2017 | Liu ..................... G02B 27/0101 |
| 2014/0022645 A1 * | 1/2014 | Matsuura ............. G02B 3/0006 |
| | | 359/626 |

(Continued)

FOREIGN PATENT DOCUMENTS

| DE | 102013208971 A1 * | 11/2014 | ......... G02B 27/0149 |
| JP | H09-292587 A | 11/1997 | |

(Continued)

OTHER PUBLICATIONS

Machine translation of Herzog et al. (DE-102013208971-A1) (Year: 2014).*

(Continued)

*Primary Examiner* — Navid Z. Mehdizadeh
*Assistant Examiner* — Sarah A. Mueller
(74) *Attorney, Agent, or Firm* — KENEALY VAIDYA LLP

(57) ABSTRACT

A vehicle display device includes a displaying part configured to emit, as display light, display information to be viewed and recognized by an occupant in a cabin as a virtual image, a reflection member configured to reflect the display light emitted from the displaying part to project the display light on a projection target part in the cabin, and a controller configured to control the display light in accordance with a detection eye box representing a detection result of an eye box representing a range of an eye point of the occupant and allowing the virtual image to be viewed and recognized.

4 Claims, 14 Drawing Sheets

(52) U.S. Cl.
CPC .......... *B60K 35/10* (2024.01); *B60K 2360/23* (2024.01); *B60K 2360/31* (2024.01); *B60K 2360/334* (2024.01); *B60K 2360/34* (2024.01)

(56) References Cited

U.S. PATENT DOCUMENTS

| | | | |
|---|---|---|---|
| 2016/0195727 A1 | 7/2016 | Kuzuhara et al. | |
| 2020/0103665 A1* | 4/2020 | Higashiyama | G02B 27/0101 |
| 2021/0070176 A1* | 3/2021 | Rao | B60K 35/00 |
| 2022/0353485 A1* | 11/2022 | Murata | G02B 27/0093 |

FOREIGN PATENT DOCUMENTS

| | | | | |
|---|---|---|---|---|
| JP | 2006133655 | A | * | 5/2006 |
| JP | 2017-9864 | A | | 1/2017 |
| JP | 2017021302 | A | * | 1/2017 |
| JP | 2020-27116 | A | | 2/2020 |
| WO | 2015/159523 | A1 | | 10/2015 |
| WO | 2021/132089 | A1 | | 7/2021 |
| WO | WO-2021132556 | A1 | * | 7/2021 ........... B60K 35/231 |

OTHER PUBLICATIONS

Machine translation of Koyama (JP-2006133655-A) (Year: 2006).*
Machine translation of Kawai et al. (JP-2017021302-A) (Year: 2017).*
Machine translation of Bunkichi et al. (WO-2021132556-A1) (Year: 2021).*
An Office Action for the related U.S. Appl. No. 18/672,006 issued on Mar. 20, 2025.

* cited by examiner

VEHICLE DISPLAY DEVICE

CROSS-REFERENCE TO RELATED APPLICATION(S)

The present application is a divisional patent application claiming priority under 35 U.S.C. § 120 to U.S. application Ser. No. 17/572,562 filed on Jan. 10, 2022, which in turn claims priority under 35 U.S.C. § 119 to Japanese Patent Application No. 2021-002499 filed in Japan on Jan. 12, 2021, the entirety of which are incorporated by reference herein.

BACKGROUND OF THE INVENTION

1. Field of the Invention

The present invention relates to a vehicle display device.

2. Description of the Related Art

Conventionally, some vehicles have been mounted with a vehicle display device configured to virtually display information to be provided to an occupant in a cabin. The vehicle display device is what is called a head-up display device including a displaying part configured to emit display light to provide display information to be projected on a projection target part and a reflection member configured to reflect the display light emitted from the displaying part to project the display light on the projection target part. The vehicle display device allows the occupant to view and recognize, as a virtual image, the display information corresponding to the display light projected on the projection target part. Such a vehicle display device is disclosed in Japanese Patent Application Laid-open No. 2017-9864, for example.

By the way, a position of the eyes of an occupant (what is called an eye point), to whom such display information is to be provided, differs depending on a seating height of the occupant and a height of a seating face of a seat, for example. Therefore, the vehicle display device needs to provide clear virtual image display regardless of the eye point in order to enhance the convenience for the occupant. However, in such a vehicle display device, it has not been desired to take such a measure that leads to an increase in power consumption, for example, by increasing the output of emission light of a light source even in order to provide clear virtual image display at such an eye point that varies.

SUMMARY OF THE INVENTION

An object of the present invention is to provide a vehicle display device making it possible to suppress power consumption from increasing, and to provide clear virtual image display in accordance with the eye point.

To achieve the above objection, a vehicle display device according to one aspect of the present invention includes a displaying part configured to emit, as display light, display information to be viewed and recognized by an occupant in a cabin as a virtual image; a reflection member configured to reflect the display light emitted from the displaying part to project the display light on a projection target part in the cabin; and a controller configured to control the display light in accordance with a detection eye point representing a detection result of an eye point of the occupant or a detection eye box representing a detection result of an eye box representing a range of the eye point, the eye box allowing the virtual image to be viewed and recognized, wherein the controller controls the displaying part to adjust an emission angle of the display light from the displaying part toward the reflection member in accordance with the detection eye point or the detection eye box to project the display light reflected by the reflection member at a viewpoint position corresponding to the detection eye point or the detection eye box on the projection target part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a vehicle display device according to the present invention will now be described in detail with reference to the accompanying drawings. Note that the present embodiment does not intend to limit the present invention.

Figure 1:
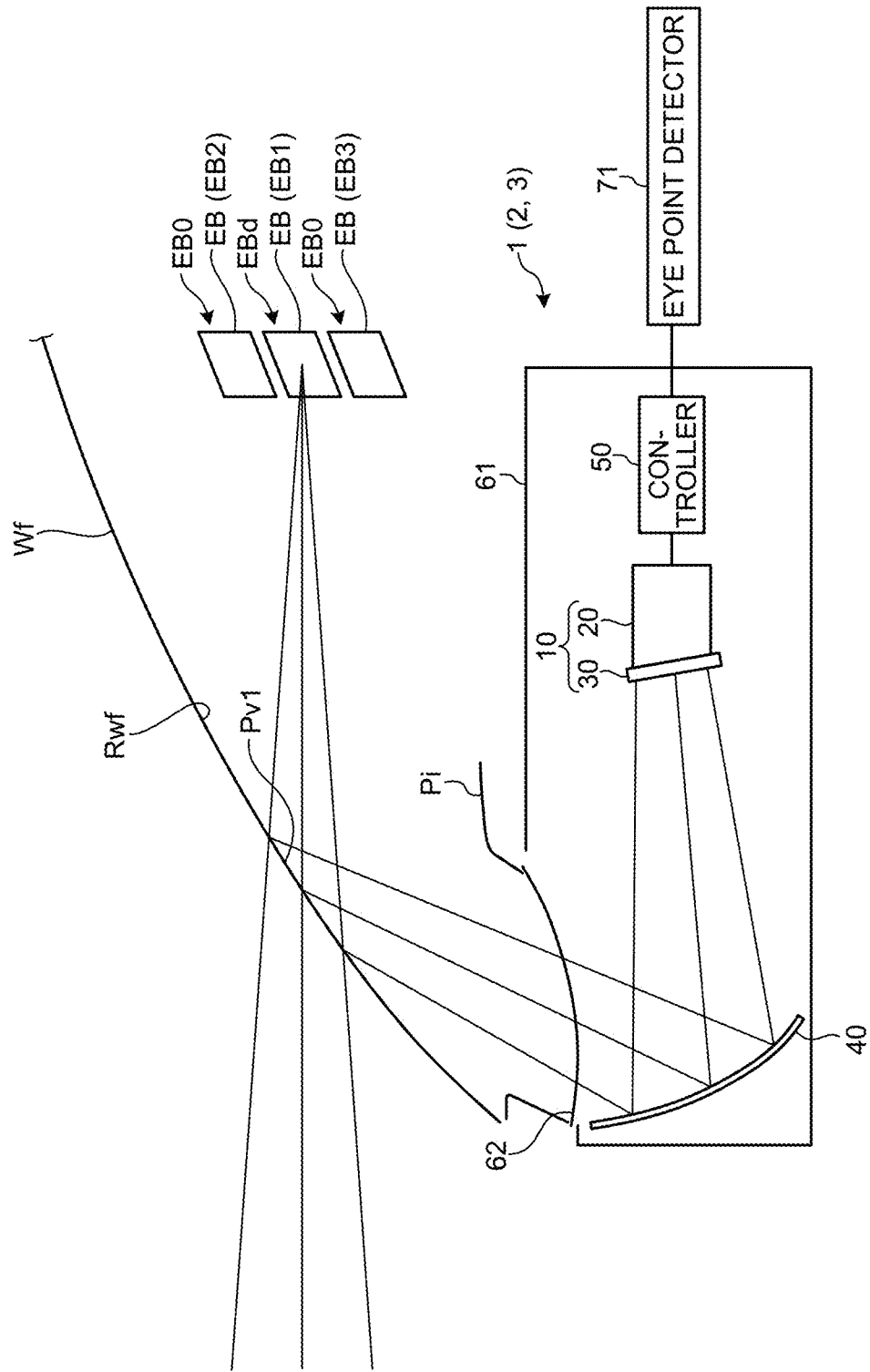
FIG. 1 is a schematic view illustrating a vehicle display device according to an embodiment and first and second modification examples, illustrating a control form with a first eye box disposed at a reference position.

The reference numeral 1 in FIG. 1 indicates the vehicle display device according to the present embodiment. Furthermore, the reference numeral 2 in FIG. 1 indicates a vehicle display device according to a first modification example. Furthermore, the reference numeral 3 in FIG. 1 indicates a vehicle display device according to a second modification example. The vehicle display devices 1, 2, 3 are what are called head-up display devices each configured to virtually display information to be provided to an occupant in a cabin of a vehicle (e.g., a motor vehicle). In addition, the vehicle display devices 1, 2, 3 illustrated in here are exemplified as head-up display devices utilizing what is called the augmented reality (AR) technology that display in an overlapped manner virtual image display information onto actual visual information that the occupant is viewing and recognizing.

The vehicle display devices 1, 2, 3 each include a displaying part 10 configured to emit, as display light, display information to be viewed and recognized by the occupant in the cabin as a virtual image (FIG. 1). The displaying part 10 includes a back light unit 20 and a display unit 30, and allows light to be emitted from the back light unit 20 toward the display unit 30, and allows display light representing display information corresponding to incident light from the back light unit 20 to be emitted from the display unit 30. Furthermore, the vehicle display devices 1, 2, 3 each include a reflection member 40 configured to reflect the display light emitted from the displaying part 10 (the display unit 30) to project the display light on a projection target part Rwf in the cabin (FIG. 1). The reflection member 40 is, for example, a magnifying mirror configured to enlarge and reflect the display light emitted from the displaying part 10. As the reflection member 40, for example, an aspheric (free form surface) mirror is used. Furthermore, the vehicle display devices 1, 2, 3 each include a controller 50 configured to perform display control for the display information (FIG. 1).

The vehicle display devices 1, 2, 3 each further include a housing 61 accommodating the displaying part 10, the reflection member 40, and the controller 50 and a cover 62 that is transparent and that covers an opening of the housing 61 (FIG. 1). In the vehicle display devices 1, 2, 3, the display light reflected by the reflection member 40 is emitted toward outside the housing 61 from the cover 62, and is projected on the projection target part Rwf that lies ahead of the housing. The vehicle display devices 1, 2, 3 illustrated in here are each accommodated in an instrument panel Pi in the cabin with the cover 62 exposed to project the display light reflected by the reflection member 40 on a reflection part, which serves as the projection target part Rwf, of a front windshield Wf (FIG. 1). In the reflection part (the projection target part Rwf) of the front windshield Wf, for example, a semi-transparent coating that partially reflects entered light and allows the rest of the entered light to pass through is applied on a wall surface, inside the cabin, of the front windshield Wf or such a semi-transparent film material is embedded in the front windshield Wf.

The display light projected on the projection target part Rwf is emitted from the projection target part Rwf and reflected by one of a plurality of eye boxes EB, and then viewed and recognized by the occupant as a virtual image (FIG. 1). The eye boxes EB respectively represent ranges of a plurality of eye points at which it is possible to view and recognize a virtual image. The eye points respectively represent positions of the eyes of the occupant in the cabin. Therefore, the eye points differ depending on a seating height of the occupant or a height of a seating face of a seat, for example. Therefore, in the vehicle display devices 1, 2, 3, the eye boxes EB are set in the cabin. In here, an eye box (hereinafter referred to as a "first eye box".) EB1 disposed at a reference position, an eye box (hereinafter referred to as a "second eye box".) EB2 disposed closer to an upper of the vehicle than the first eye box EB1, and an eye box (hereinafter referred to as a "third eye box".) EB3 disposed closer to a lower of the vehicle than the first eye box EB1 are set (FIG. 1). Note that the eye boxes EB may be arranged in vehicle width directions.

Embodiment

The vehicle display device 1 according to the present embodiment will first be described herein.

Figure 2:
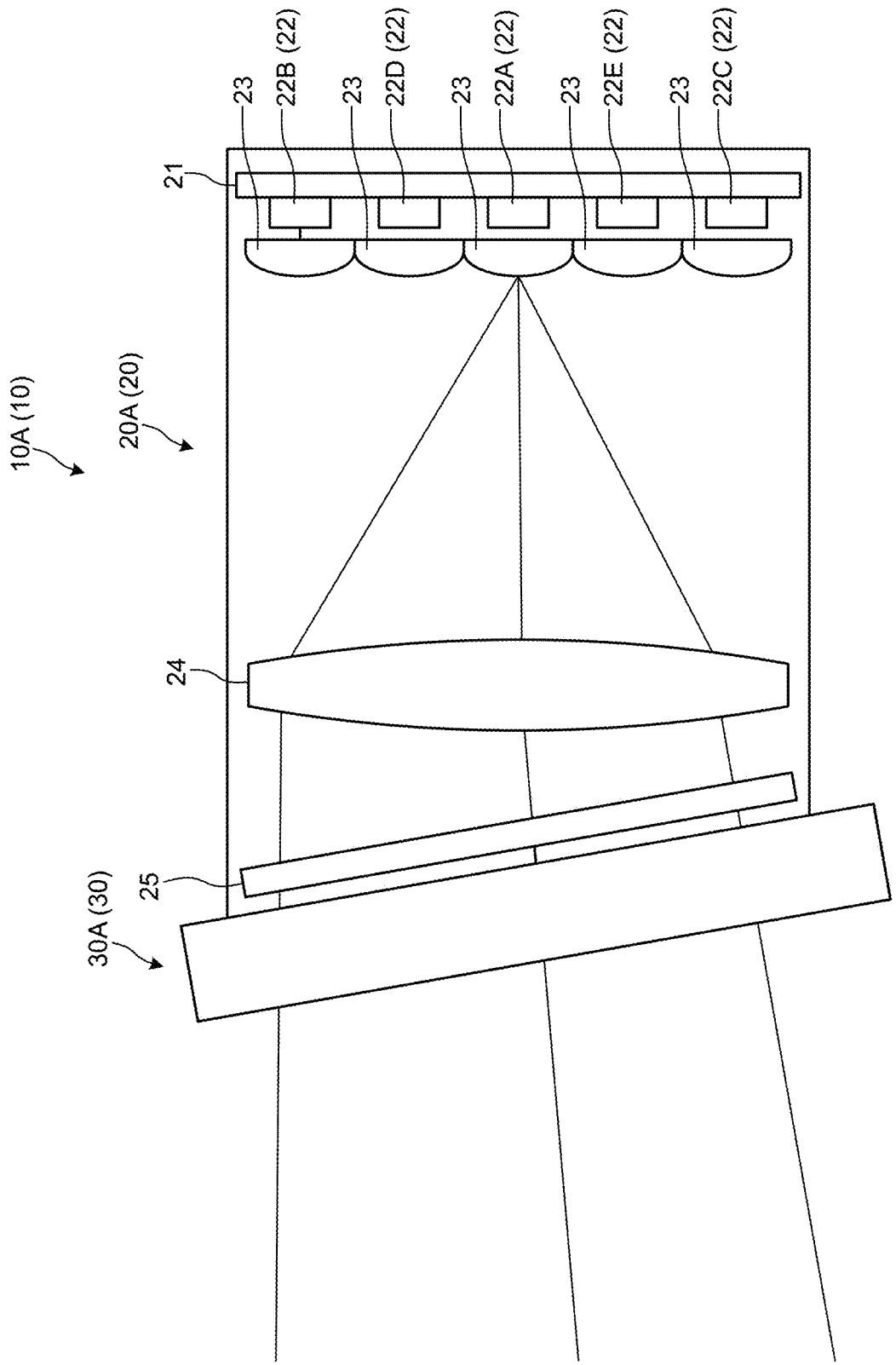
FIG. 2 is a schematic view illustrating a displaying part according to the present embodiment, illustrating the control form with the first eye box disposed at the reference position.

In the vehicle display device 1 according to the present embodiment, the displaying part 10 including the back light unit 20 and the display unit 30 is configured as a displaying part 10A including a back light unit 20A and a display unit 30A, as described below (FIG. 2).

The back light unit 20A according to the present embodiment includes a substrate 21, a plurality of light sources 22, a plurality of collecting lenses 23, a field lens 24, and a diffusion member 25 (FIG. 2). In the back light unit 20A, the collecting lenses 23 collect emission light from the light sources 22. The emission light from the collecting lenses 23 then enters the field lens 24. In the back light unit 20A, the field lens 24 refracts the incident light. Emission light aligned in an advancing direction by the field lens 24 enters the diffusion member 25. The diffusion member 25 diffuses the incident light at a wide angle preferable for the display unit 30A. The diffused light is then emitted toward the display unit 30A.

The substrate 21 is a member for fixing the light sources 22. The substrate 21 is formed into a rectangular flat plate shape. The light sources 22 are fixed to one plane (FIGS. 2 and 3).

Figure 3:
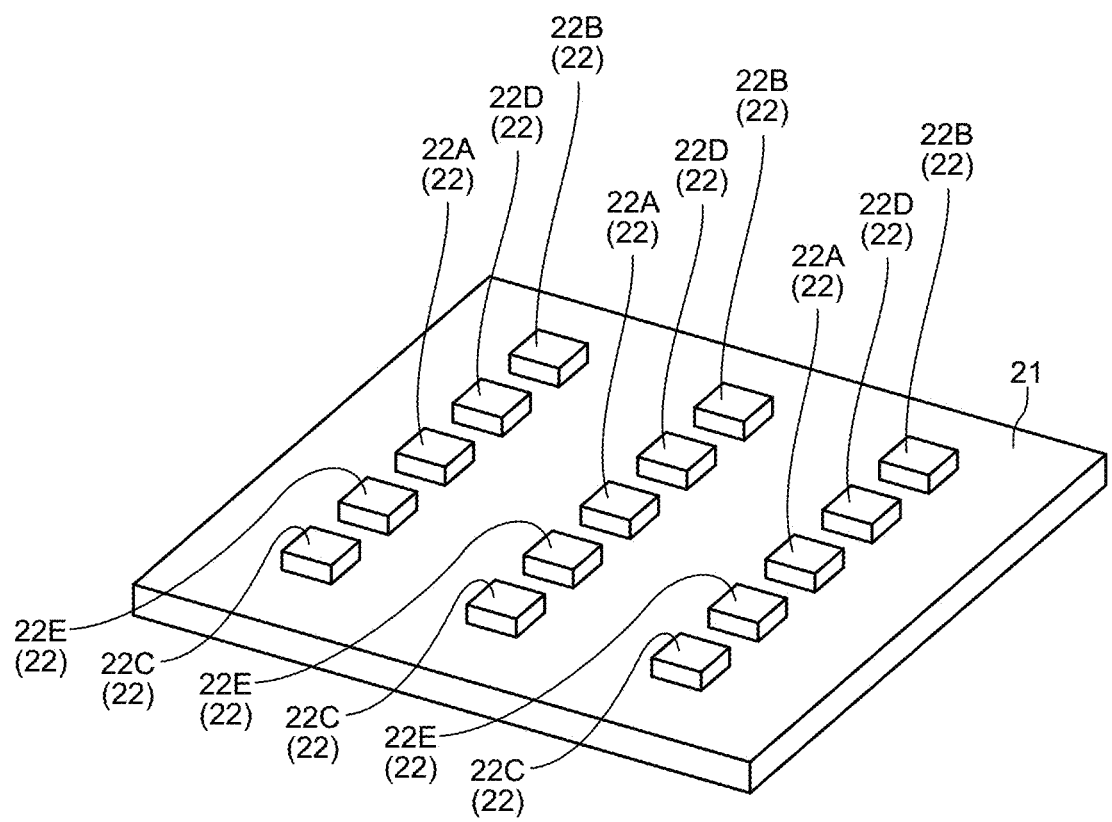
FIG. 3 is a perspective view illustrating the arrangement of a plurality of light sources according to the present embodiment.

The back light unit 20A is provided, to respectively correspond to the eye boxes EB, with the light sources 22 respectively allowing display light at emission angles corresponding to the eye boxes EB to be emitted from the display unit 30A (FIGS. 2 and 3). The displaying part 10A exemplified in here is disposed closer to a rear of the vehicle than the reflection member 40 to emit display light toward the reflection member 40 disposed closer to a front of the vehicle. In addition, in the vehicle display device 1, reflected light from the reflection member 40, which is based on the emission light of the display light, is inverted in vehicle upper and lower directions and projected on the projection target part Rwf. Therefore, the light sources 22 illustrated in here are arranged, in accordance with the eye boxes EB (the first eye box EB1, the second eye box EB2, and the third eye box EB3) positioned in the vehicle upper and lower directions, in order toward the lower of the vehicle from the light sources 22 corresponding to one, which is disposed closer to the upper of the vehicle (the second eye box EB2), of the eye boxes EB.

The back light unit 20A may only include, as the light sources 22, those respectively corresponding to the eye boxes EB as described above. However, in the back light unit 20A illustrated in here, a plurality of other light sources (hereinafter referred to as a plurality of "sub light sources".) 22 are also provided, as the light sources 22, in addition to the light sources (hereinafter referred to as a plurality of "main light sources".) 22 respectively corresponding to the eye boxes EB. The sub light sources 22 are each disposed between each two of the main light sources 22, which respectively correspond to the eye boxes EB adjacent to each other (FIGS. 2 and 3). In here, a plurality of first main light sources 22A corresponding to the first eye box EB1 disposed at the reference position, a plurality of second main light sources 22B corresponding to the second eye box EB2 disposed closer to the upper of the vehicle, a plurality of third main light sources 22C corresponding to the third eye box EB3 disposed closer to the lower of the vehicle, first sub light sources 22D disposed between the first main light sources 22A and the second main light sources 22B, and second sub light sources 22E disposed between the first main light sources 22A and the third main light sources 22C are provided.

In the back light unit 20A, the first main light sources 22A, the second main light sources 22B, the third main light sources 22C, the first sub light sources 22D, and the second sub light sources 22E are respectively provided in the vehicle width directions (FIG. 3). In here, the first main light sources 22A, the second main light sources 22B, the third main light sources 22C, the first sub light sources 22D, and the second sub light sources 22E are respectively provided in the vehicle width directions each at the same number (each three in this example). That is, all the light sources 22 are disposed in a grid on the one plane of the substrate 21.

As the light sources 22 illustrated in here, a plurality of light emitting diodes (LEDs) are used. The light sources 22 are supplied with power from a power supply (not illustrated) such as a secondary battery of the vehicle. Furthermore, the controller 50 controls and causes the light sources 22 to turn on or off, as well as controls the output of emission light when the light sources are caused to turn on.

The collecting lenses 23 are lens members made of glass or transparent resin that collect light from the light sources 22, and are respectively provided to correspond to the light sources 22. The collecting lenses 23 each have an incidence face allowing light to enter and an emission face allowing the light that has entered the incidence face to exit. In addition, for the collecting lenses 23, the incidence faces are respectively disposed to face light emission parts of the light sources 22, and the emission faces are disposed to face the display unit 30A. Each of the collecting lenses 23 illustrated in here is formed to serve as a plane convex lens, where the incidence face is formed into a flat surface and the emission face is formed into a convex, curved surface. Furthermore, the collecting lenses 23 illustrated in here are each formed into a substantially rectangular shape, when viewed from the display unit 30A.

The field lens 24 is a lens member made of glass or transparent resin that aligns, in the advancing direction, light emitted from the collecting lenses 23, and is disposed between all the collecting lenses 23 and the display unit 30A. The field lens 24 has an incidence face allowing light to enter and an emission face allowing the light that has entered the incidence face to exit. In addition, for the field lens 24, the incidence face is disposed to face the emission faces of all the collecting lenses 23, and the emission face is disposed to face the display unit 30A. The field lens 24 illustrated in here is formed to serve as a biconvex lens, where the incidence face and the emission face are respectively formed into convex, curved surfaces. Furthermore, the field lens 24 illustrated in here is formed into a substantially rectangular shape, when viewed from the display unit 30A.

The diffusion member 25 is an optical element such as a diffusion plate that diffuses light emitted from the field lens 24 toward the whole of each of the eye boxes EB, and is disposed between the field lens 24 and the display unit 30A. The diffusion member 25 is formed into a rectangular flat plate shape, where one plane (an incidence face) is disposed to face the emission face of the field lens 24, and another plane (an emission face) is disposed to face a back face of the display unit 30A. In the diffusion member 25, a diffusion angle may be constant in the vehicle upper and lower directions and the vehicle width directions, or otherwise the diffusion angle may vary in the vehicle upper and lower directions and the vehicle width directions. For example, the eye boxes EB used ordinarily each have a longer length in the vehicle width directions than a length in the vehicle upper and lower directions. Therefore, the diffusion member 25, when it has a wider diffusion angle in the vehicle width directions than a diffusion angle in the vehicle upper and lower directions, makes it possible to increase efficiency when light is diffused toward the whole of each of the eye boxes EB. Furthermore, it is possible to increase its efficiency by using, together with the diffusion member 25, such an element as a lens array that its diffusion characteristic is a top-hat type, for example.

In the back light unit 20A, light emitted from the diffusion member 25 serves as emission light emitted toward the display unit 30A.

The display unit 30A according to the present embodiment is configured in such a manner that the back face allows emission light of the back light unit 20A to enter, and a front face allows display light corresponding to incident light from the back face to be emitted toward the reflection member 40. For example, as the display unit 30A, a transmission type thin film transistor (TFT) liquid crystal display is used, for example. The controller 50 controls the display unit 30A to display the display information. For example, as the display information, image information including characters, numbers, and figures, for example, is displayed.

The vehicle display device 1 is configured to allow the controller 50 to perform control as described below in order to provide clear virtual image display regardless of the eye point of the occupant.

Figure 4:
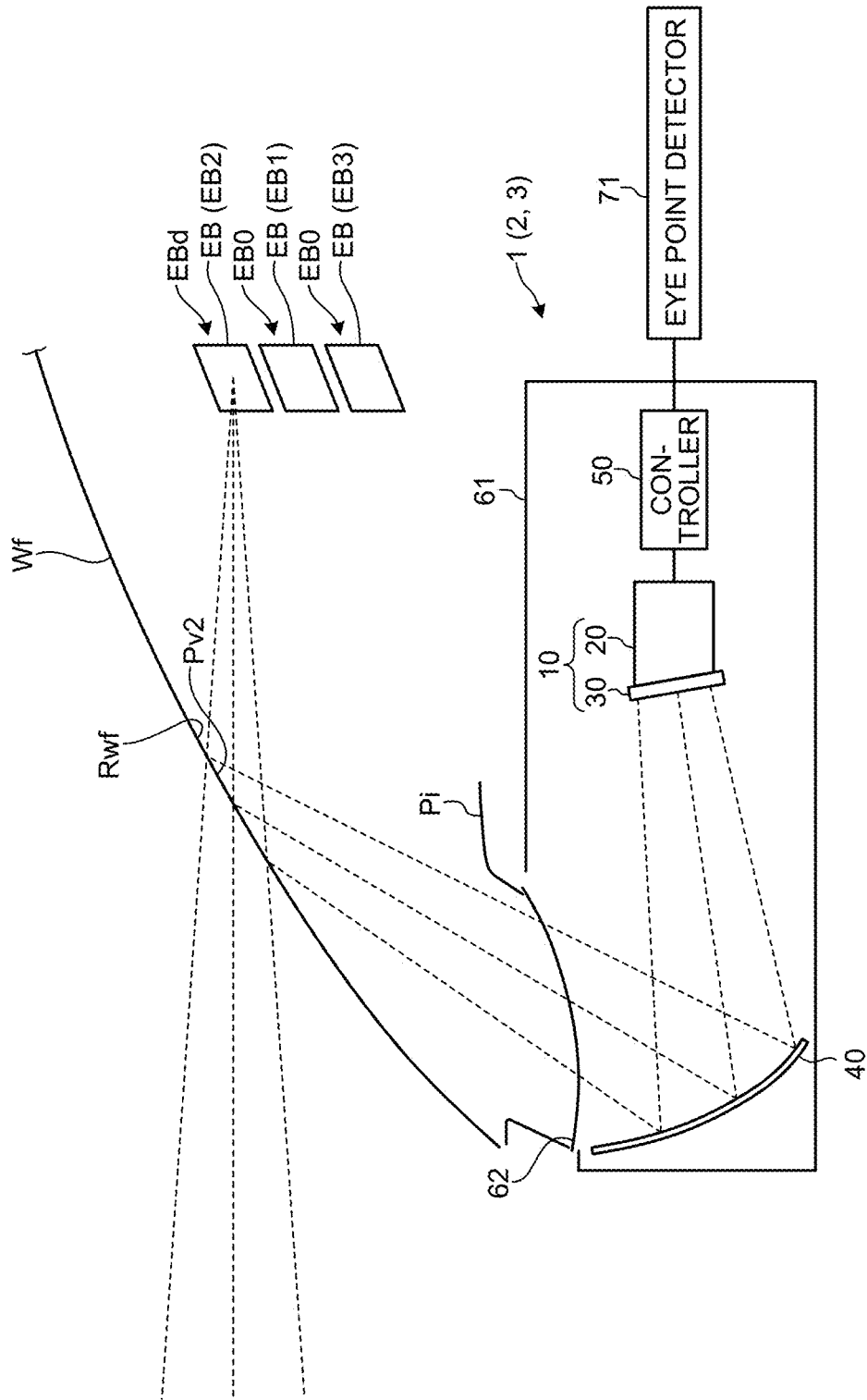
FIG. 4 is a schematic view illustrating the vehicle display device according to the present embodiment and the first and second modification examples, illustrating a control form with a second eye box disposed closer to an upper of a vehicle.
Figure 6:
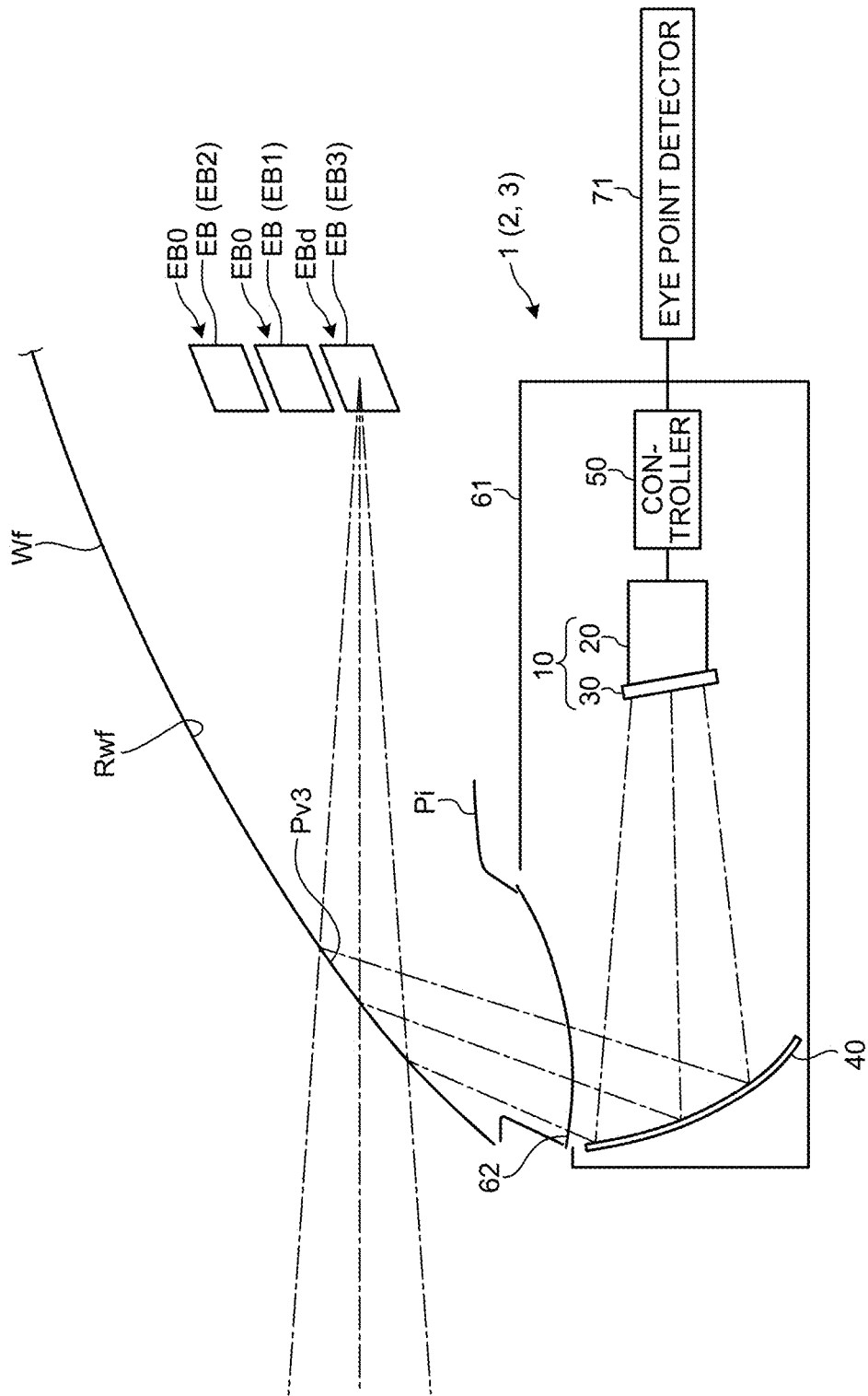
FIG. 6 is a schematic view illustrating the vehicle display device according to the present embodiment and the first and second modification examples, illustrating a control form with a third eye box disposed closer to a lower of the vehicle.

The controller 50 controls display light in accordance with a detection eye box EBd representing a detection result of one of the eye boxes EB (FIGS. 1, 4, and 6). The controller 50 illustrated in here detects one of the eye boxes EB, which corresponds to the eye point of the occupant, to control display light in accordance with the detection eye box EBd.

The controller 50 first detects one of the eye boxes EB on the basis of a detection signal of an eye point detector 71 configured to detect the eye point of the occupant (FIGS. 1, 4, and 6). The vehicle display device 1 may include the eye point detector 71, or may utilize a detection signal of the eye point detector 71 that the vehicle includes.

Next, the controller 50 controls the displaying part 10A to adjust an emission angle of display light from the displaying part 10A toward the reflection member 40 in accordance with the detection eye box EBd to project display light reflected by the reflection member 40 at a viewpoint position corresponding to the detection eye box EBd on the projection target part Rwf. Specifically, the controller 50 according to the present embodiment causes the light sources 22 corresponding to the detection eye box EBd to turn on, and causes the light sources 22 corresponding to a plurality of non-detection eye boxes EB0 other than the detection eye box EBd to turn off to adjust an emission angle of display light from the display unit 30A toward the reflection member 40 to an emission angle corresponding to the detection eye box EBd (FIGS. 1, 2, and 4 to 7).

FIGS. 1 and 2 illustrate a case where the detection eye box EBd corresponds to the first eye box EB1 disposed at the reference position, the first main light sources 22A corresponding to the first eye box EB1 are caused to turn on, and all the rest of the light sources 22 are caused to turn off. In this case, an emission angle of display light from the display unit 30A toward the reflection member 40 is adjusted to an emission angle corresponding to the first eye box EB1, and display light reflected by the reflection member 40 is projected at a viewpoint position Pv1 corresponding to the first eye box EB1 on the projection target part Rwf.

Figure 5:
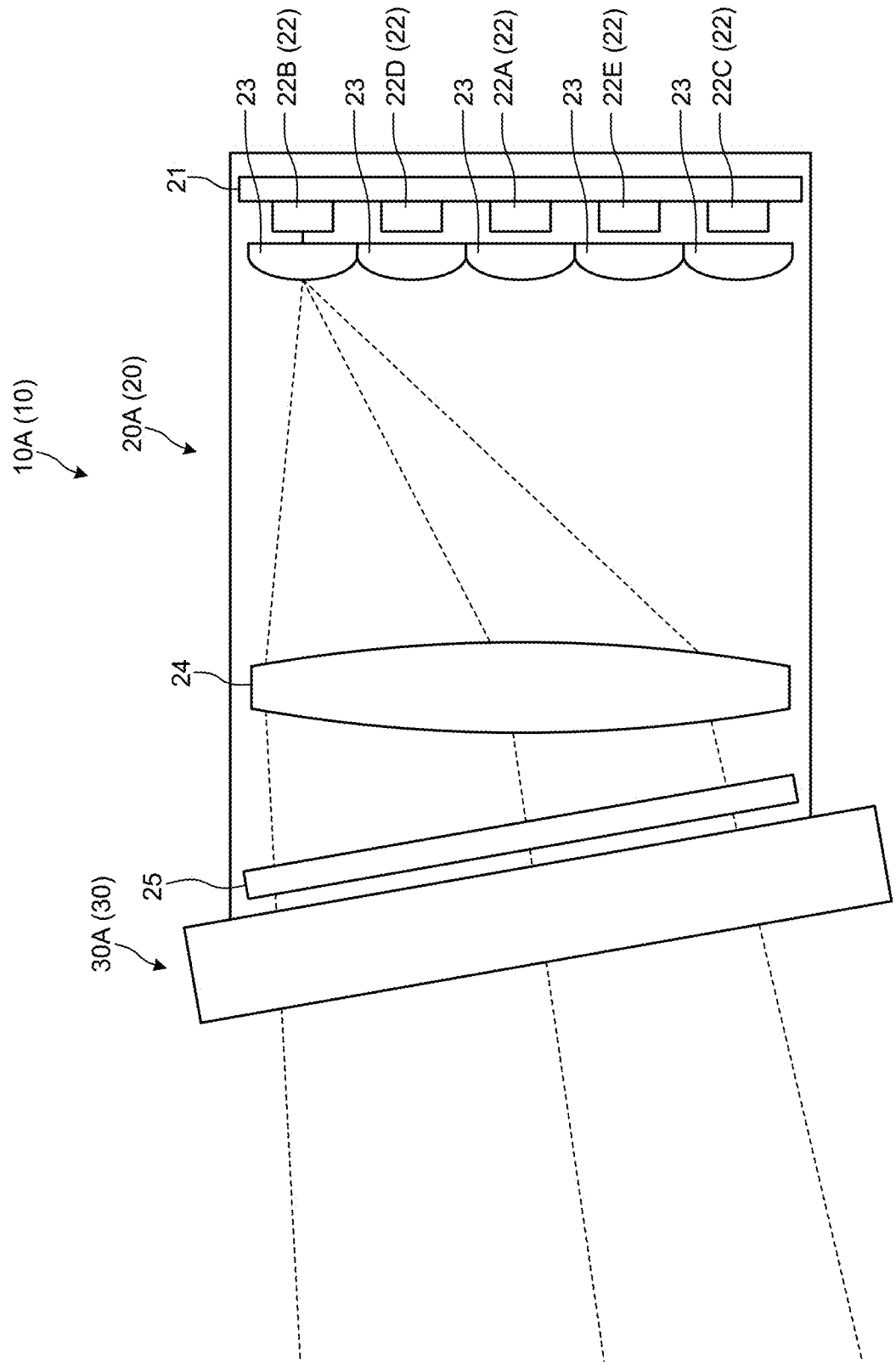
FIG. 5 is a schematic view illustrating the displaying part according to the present embodiment, illustrating the control form with the second eye box disposed closer to the upper of the vehicle.

FIGS. 4 and 5 illustrate a case where the detection eye box EBd corresponds to the second eye box EB2 disposed closer to the upper of the vehicle, the second main light sources 22B corresponding to the second eye box EB2 are caused to turn on, and all the rest of the light sources 22 are caused to turn off. In this case, an emission angle of display light from the display unit 30A toward the reflection member 40 is adjusted to an emission angle corresponding to the second eye box EB2, and display light reflected by the reflection member 40 is projected at a viewpoint position Pv2 corresponding to the second eye box EB2 on the projection target part Rwf (the viewpoint position Pv2 disposed closer to the upper of the vehicle than the viewpoint position Pv1 corresponding to the first eye box EB1 disposed at the reference position).

Figure 7:
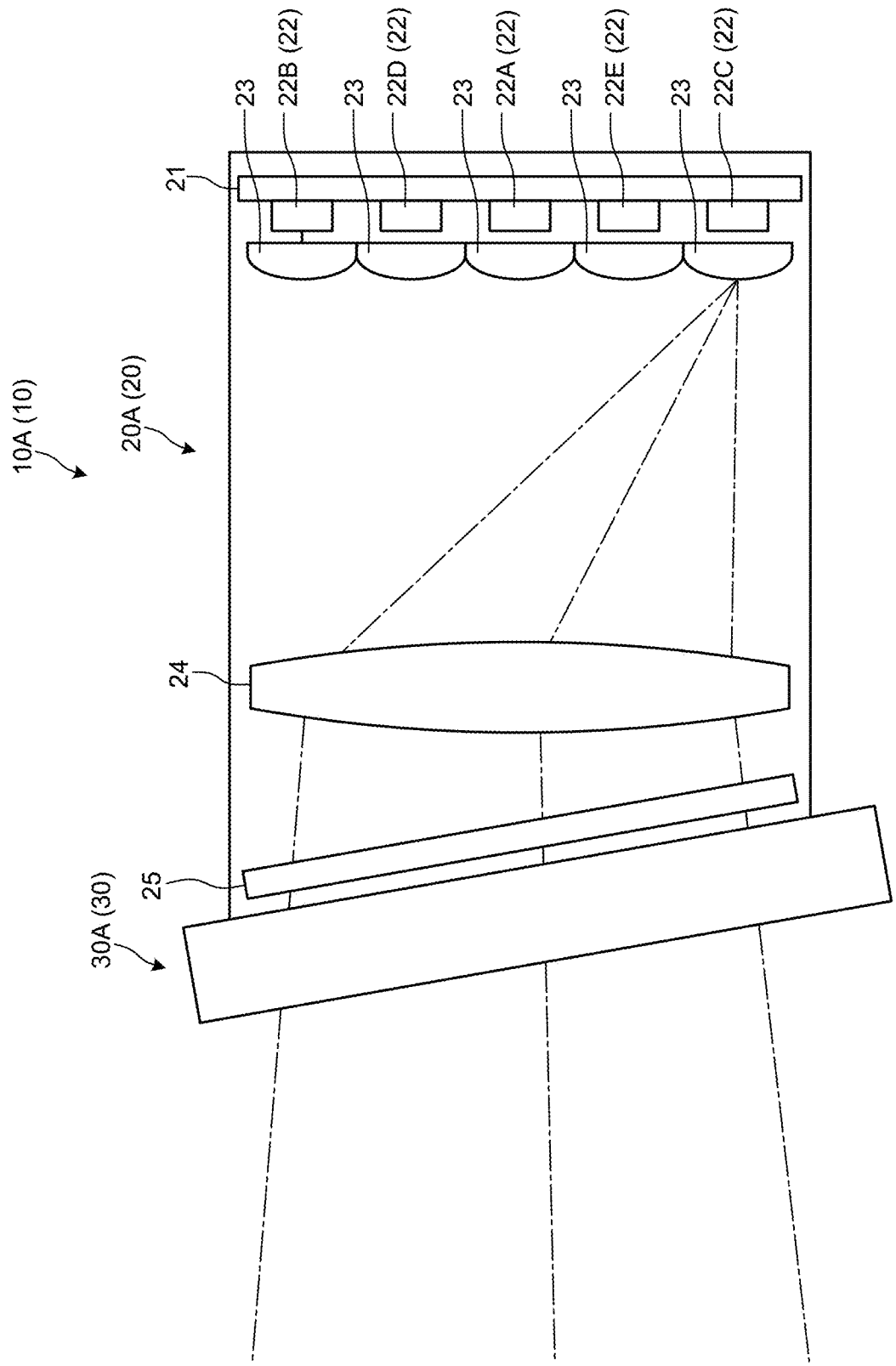
FIG. 7 is a schematic view illustrating the displaying part according to the present embodiment, illustrating the control form with the third eye box disposed closer to the lower of the vehicle.

FIGS. 6 and 7 illustrate a case where the detection eye box EBd corresponds to the third eye box EB3 disposed closer to the lower of the vehicle, the third main light sources 22C corresponding to the third eye box EB3 are caused to turn on, and all the rest of the light sources 22 are caused to turn off. In this case, an emission angle of display light from the display unit 30A toward the reflection member 40 is adjusted to an emission angle corresponding to the third eye box EB3, and display light reflected by the reflection member 40 is projected at a viewpoint position Pv3 corresponding to the third eye box EB3 on the projection target part Rwf (the viewpoint position Pv3 disposed closer to the lower of the vehicle than the viewpoint position Pv1 corresponding to the first eye box EB1 disposed at the reference position).

As illustrated above, the vehicle display device 1 according to the present embodiment controls the displaying part 10A for causing the light sources 22 corresponding to the detection eye box EBd to turn on, and for causing the rest of the light sources 22 to turn off to adjust an emission angle of display light from the displaying part 10A toward the reflection member 40 to an emission angle corresponding to the detection eye box EBd to project display light reflected by the reflection member 40 at a viewpoint position corresponding to the detection eye box EBd on the projection target part Rwf. Therefore, the vehicle display device 1 makes it possible to provide clear virtual image display in accordance with the eye point of the occupant.

Furthermore, in conventional vehicle display devices, in order to diffuse light at a wider angle in accordance with a position of each of the eye boxes EB, for example, a diffusion member having a greater diffusion angle is used, and a decrease in luminance due to the application of such a diffusion member is suppressed by increasing the output of emission light from a light source. However, the vehicle display device 1 according to the present embodiment does not use a diffusion member having a greater diffusion angle, but is able to control the displaying part 10A for switching the light sources 22 to be caused to turn on to diffuse light at a wider angle in accordance with a position of each of the eye boxes EB. Thus, there is a less decrease in luminance along with a change of each of the eye boxes EB, as can be seen in the conventional vehicle display devices, as well as there is no need to increase the output of the light sources 22. Therefore, the vehicle display device 1 makes it possible to suppress an increase in power consumption.

As described above, the vehicle display device 1 according to the present embodiment makes it possible to suppress an increase in power consumption, and to provide clear virtual image display in accordance with the eye point.

By the way, the vehicle display device 1 according to the present embodiment may cause the controller 50 to perform such control as described below, when it is possible to detect a displacement of the detection eye box EBd.

Figure 8:
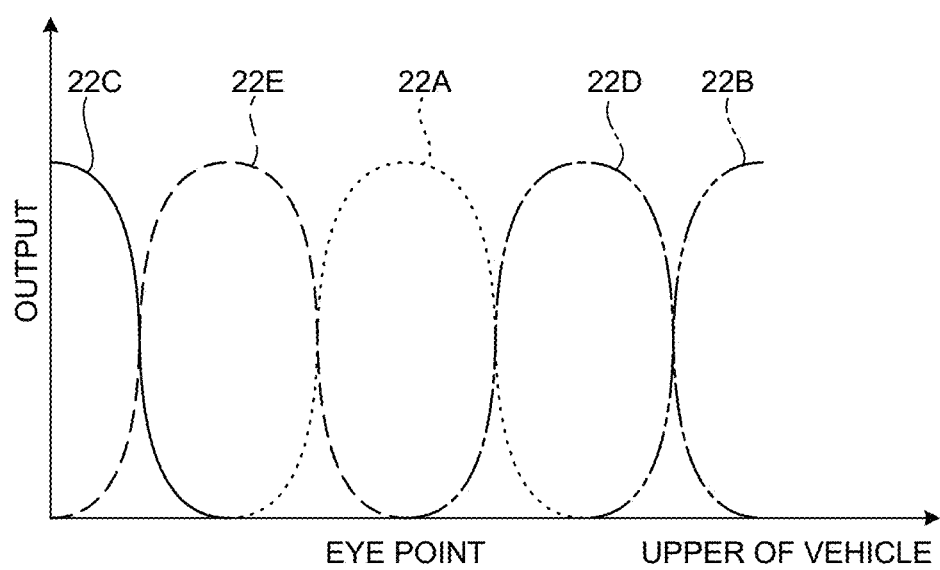
FIG. 8 is a view illustrating a modification form of lighting control for the light sources in the vehicle display device according to the present embodiment.

When the detection eye box EBd is displaced to the next eye box EB, the controller 50 decreases the output of the main light sources corresponding to the current detection eye box EBd that have been caused to turn on, increases the output of the sub light sources disposed between the main light sources corresponding to the current detection eye box EBd and the main light sources corresponding to the next eye box EBd, decreases the output of the sub light sources when the output of the sub light sources reaches a maximum value, and increases the output of the main light sources corresponding to the next eye box EBd, that is, the next detection eye box EBd (FIG. 8). For example, when the current detection eye box EBd corresponds to the first eye box EB1 disposed at the reference position, and is displaced to the second eye box EB2 disposed closer to the upper of the vehicle, the output of the first main light sources 22A corresponding to the first eye box EB1 disposed at the reference position, which have been caused to turn on, is decreased, the output of the first sub light sources 22D disposed between the first main light sources 22A and the second main light sources 22B corresponding to the second eye box EB2 disposed closer to the upper of the vehicle is increased, the output of the first sub light sources 22D is decreased when the output of the first sub light sources 22D reaches a maximum value, and the output of the second main light sources 22B corresponding to the second eye box EB2 disposed closer to the upper of the vehicle, that is, the next detection eye box EBd is increased. Note that, in FIG. 8, a total value of the output of two adjacent sets of the light sources 22 is made constant, and, when the output of one set of the light sources 22 is decreased, the output of the other set of the light sources 22 is increased by the amount of the decrease. However, for example, the controller 50 may determine, in order to increase or decrease a total value of the output of the two adjacent sets of the light sources 22 in accordance with the eye point (one of the eye boxes EB), an amount of decrease for the output of one set of the light sources 22 and an amount of increase for the output of the other set of the light sources 22.

Therefore, the vehicle display device 1 according to the present embodiment makes it possible to decrease an amount of change in luminance along with a change of the eye point of the occupant in the vehicle upper and lower directions.

Furthermore, the vehicle display device 1 according to the present embodiment may cause the controller 50 to perform such control as described below, when it is possible to detect not only a change of the eye point of the occupant in the vehicle upper and lower directions, but also a change of the eye point of the occupant in the vehicle width directions. In the vehicle display device 1 in this case, the light sources 22 are set to respectively correspond to the eye points of an occupant to allow each set to correspond to the eye point of the occupant. In addition, the controller 50 causes only the light sources 22 corresponding to the detection eye point to turn on, for example. Furthermore, the controller 50 causes, for example, the light sources 22 corresponding to the detection eye point and all the light sources 22 around the light sources 22 corresponding to the detection eye point to turn on, and causes all the rest of the light sources 22 to turn off. The vehicle display device 1 according to the present embodiment makes it possible, through such control as described above, to decrease an amount of change in luminance along with a change of the eye point of the occupant in various directions.

Furthermore, the vehicle display device 1 according to the present embodiment may be configured in such a manner that the reflection member 40 is provided with a rotation axis (not illustrated) having an axis line extending in the vehicle width directions, and the controller 50 rotates the reflection member 40 around the rotation axis. In this case, the controller 50 may rotate the reflection member 40 and perform the control described above to project display light reflected by the reflection member 40 at a viewpoint position corresponding to the detection eye box EBd on the projection target part Rwf. Furthermore, in this case, the controller 50 may recognize the detection eye box EBd on the basis of a rotated position of the reflection member 40.

Note herein that the vehicle display device 1 exemplified in here is configured and disposed in such a manner that the displaying part 10A is disposed closer to the rear of the vehicle than the reflection member 40, the displaying part 10A emits display light toward the reflection member 40 disposed closer to the front of the vehicle, and reflected light from the reflection member 40, which is based on the emission light, is inverted in the vehicle upper and lower directions and projected on the projection target part Rwf. However, the vehicle display device 1 according to the present embodiment may be configured and disposed as described below.

For example, the vehicle display device 1 according to the present embodiment may be configured and disposed (not illustrated) in such a manner that the displaying part 10A is disposed closer to the front of the vehicle and the lower of the vehicle than the reflection member (hereinafter referred to as a "first reflection member".) 40, another reflection member (hereinafter referred to as a "second reflection member".) is disposed closer to the front of the vehicle than the first reflection member 40, the displaying part 10A emits display light toward the first reflection member 40, reflected light from the first reflection member 40, which is based on the emission light, is inverted in the vehicle upper and lower directions by the second reflection member and projected, and reflected light from the second reflection member, which is based on the projection light, is inverted in the vehicle upper and lower directions and projected on the projection target part Rwf. In this case, the light sources 22 are arranged, similar to the example described above, in accordance with the eye boxes EB (the first eye box EB1, the second eye box EB2, and the third eye box EB3) positioned in the vehicle upper and lower directions, in order toward the lower of the vehicle from the light sources 22 corresponding to one, which is disposed closer to the upper of the vehicle (the second eye box EB2), of the eye boxes EB.

Furthermore, for example, the vehicle display device 1 according to the present embodiment may be configured and disposed (not illustrated) in such a manner that the displaying part 10A is disposed closer to the front of the vehicle than the reflection member 40, the displaying part 10A emits display light toward the reflection member 40 disposed closer to the rear of the vehicle, and reflected light from the reflection member 40, which is based on the emission light, is not inverted in the vehicle upper and lower directions, but projected on the projection target part Rwf. Furthermore, the vehicle display device 1 according to the present embodiment may be configured and disposed (not illustrated) in such a manner that the displaying part 10A is disposed closer to the rear of the vehicle than the reflection member (hereinafter referred to as the "first reflection member".) 40, another reflection member (hereinafter referred to as the "second reflection member".) is disposed closer to the rear of the vehicle and the upper of the vehicle than the first reflection member 40, the displaying part 10A emits display light toward the first reflection member 40 disposed closer to the front of the vehicle, and reflected light from the first reflection member 40, which is based on the emission light, is not inverted in the vehicle upper and lower directions by the second reflection member, but projected, and reflected light from the second reflection member, which is based on the projection light, is not inverted in the vehicle upper and lower directions, but projected on the projection target part Rwf. When configured and disposed as described above, in order to suppress a virtual image from being inverted in the vehicle upper and lower directions, the light sources 22 are arranged, in accordance with the eye boxes EB (the first eye box EB1, the second eye box EB2, and the third eye box EB3) positioned in the vehicle upper and lower directions, in order toward the upper of the vehicle from the light sources 22 corresponding to one, which is disposed closer to the upper of the vehicle (the second eye box EB2), of the eye boxes EB.

Note that, although the vehicle display device 1 according to the present embodiment has been illustrated, where such control as described above is performed on the basis of the detection eye box EBd, such control as described above may be performed on the basis of a detection eye point detected from a detection signal of the eye point detector 71. In this case, the eye box described above is read as an eye point.

First Modification Example

Next, the vehicle display device 2 according to the first modification example will now be described herein.

Figure 9:
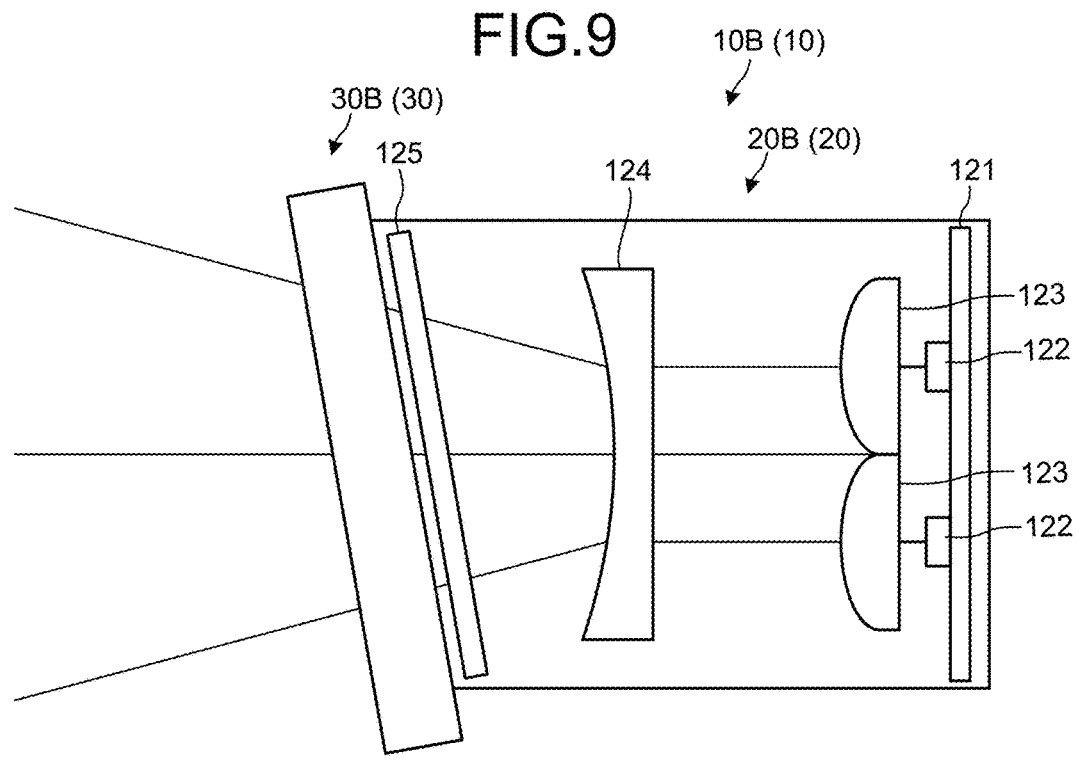
FIG. 9 is a schematic view illustrating a displaying part according to the first modification example, illustrating the control form with the first eye box disposed at the reference position.

In the vehicle display device 2 according to the modification example, the displaying part 10 including the back light unit 20 and the display unit 30 is configured as a displaying part 10B including a back light unit 20B and a display unit 30B, as described below (FIG. 9).

The back light unit 20B according to the modification example includes a substrate 121, a plurality of light sources 122, a plurality of collecting lenses 123, a field lens 124, and a diffusion member 125 (FIG. 9). In the back light unit 20B, the collecting lenses 123 collect emission light from the light sources 122. The emission light from the collecting lenses 123 then enters the field lens 124. In the back light unit 20B, the field lens 124 refracts the incident light. Emission light aligned in the advancing direction by the field lens 124 enters the diffusion member 125. The diffusion member 125 diffuses the incident light at a wide angle preferable for the display unit 30B. The diffused light is then emitted toward the display unit 30B.

The substrate 121 is a member for fixing the light sources 122. The substrate 121 is formed into a rectangular flat plate shape, similar to the substrate 21 according to the present embodiment. The light sources 122 are fixed to one plane (FIG. 9).

As the light sources 122, a plurality of light emitting diodes are used, similar to the light sources 22 according to the present embodiment. The controller 50 controls and causes the light sources to turn on or off, as well as controls the output of emission light when the light sources are caused to turn on. The light sources 122 according to the modification example are arranged two in the vehicle upper and lower directions by three in the vehicle width directions, for example.

The collecting lenses 123 are lens members made of glass or transparent resin that collect light from the light sources 122, and are respectively provided to correspond to the light sources 122. The collecting lenses 123 according to the modification example are each formed into an identical plane convex lens to that of the collecting lenses 23 according to the present embodiment. Their flat incidence faces are respectively disposed to face light emission parts of the light sources 122, and their convex emission faces are disposed to face the display unit 30B. Light from the light sources 122 via the collecting lenses 123 may enter regions divided on a back face of the display unit 30B, or may enter in an overlapped manner part or whole of the regions adjacent to each other.

The field lens 124 is a lens member made of glass or transparent resin that aligns, in the advancing direction, light emitted from the collecting lenses 123, and is disposed between all the collecting lenses 123 and the display unit 30B. The field lens 124 has an incidence face allowing light to enter and an emission face allowing the light that has entered the incidence face to exit. In addition, for the field lens 124, the incidence face is disposed to face the emission faces of all the collecting lenses 123, and the emission face is disposed to face the display unit 30B. The field lens 124 illustrated in here is formed to serve as a plane concave lens, where the incidence face is formed into a flat surface and the emission face is formed into a concave, curved face. That is, in the field lens 124 illustrated in here, the emission face allowing light entering the incidence face from the light sources 122 to exit toward the display unit 30B is formed into a concave, curved face. Furthermore, the field lens 124 illustrated in here is formed into a substantially rectangular shape, when viewed from the display unit 30B.

The diffusion member 125 is an optical element such as a diffusion plate that diffuses light emitted from the field lens 124 toward the whole of each of the eye boxes EB, and is disposed between the field lens 124 and the display unit 30B. The diffusion member 125 according to the modification example is identical to the diffusion member 25 according to the present embodiment, where one plane (an incidence face) is disposed to face the emission face of the field lens 124, and another plane (an emission face) is disposed to face the back face of the display unit 30B.

For the back light unit 20B, similar to the present embodiment, it is possible to increase its efficiency when light is diffused toward the whole of each of the eye boxes EB by using, together with the diffusion member 125, such an element as a lens array that its diffusion characteristic is a top-hat type, for example.

In the back light unit 20B, light emitted from the diffusion member 125 serves as emission light emitted toward the display unit 30B.

The display unit 30B according to the modification example is identical to the display unit 30A according to the present embodiment described above. In addition, the vehicle display device 2 according to the modification example is configured and disposed, similar to the vehicle display device 1 specifically exemplified in the present embodiment, in such a manner that the displaying part 10B is disposed closer to the rear of the vehicle than the reflection member 40, the displaying part 10B emits display light toward the reflection member 40 disposed closer to the front of the vehicle, and reflected light from the reflection member 40, which is based on the emission light, is inverted in the vehicle upper and lower directions and projected on the projection target part Rwf.

The vehicle display device 2 is configured to allow the controller 50 to perform control as described below in order to provide clear virtual image display regardless of the eye point of the occupant.

The controller 50 relatively moves the field lens 124 relative to the light sources 122 on the basis of the detection eye box EBd representing a detection result of one of the eye boxes EB to control display light in accordance with the detection eye box EBd (FIGS. 1, 4, and 6). The controller 50 illustrated in here detects one of the eye boxes EB, which corresponds to the eye point of the occupant, to relatively move the field lens 124 on the basis of the detection eye box EBd.

Figure 10:
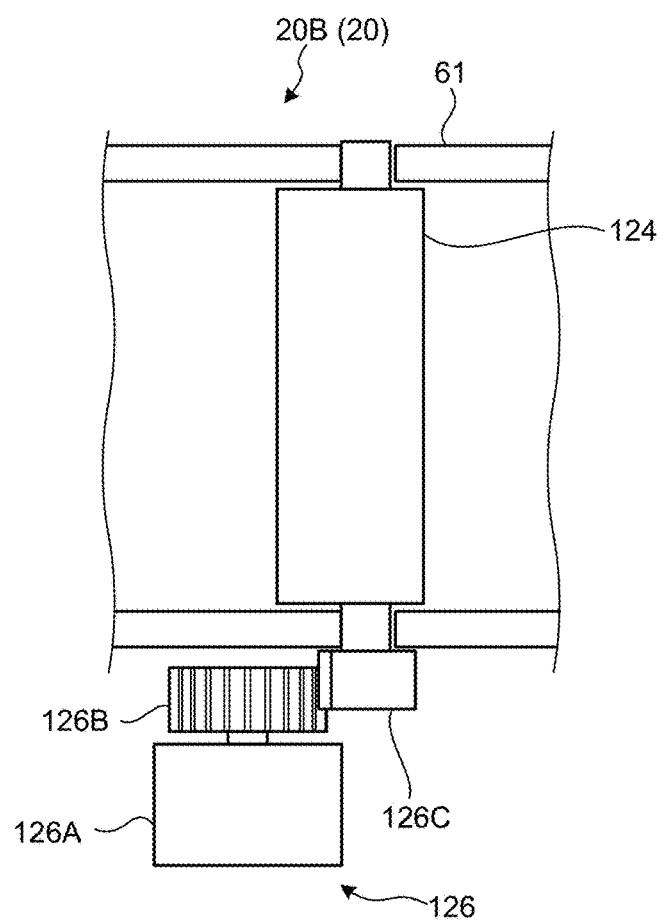
FIG. 10 is a schematic view when a driving part according to the first modification example is viewed from above the vehicle.
Figure 11:
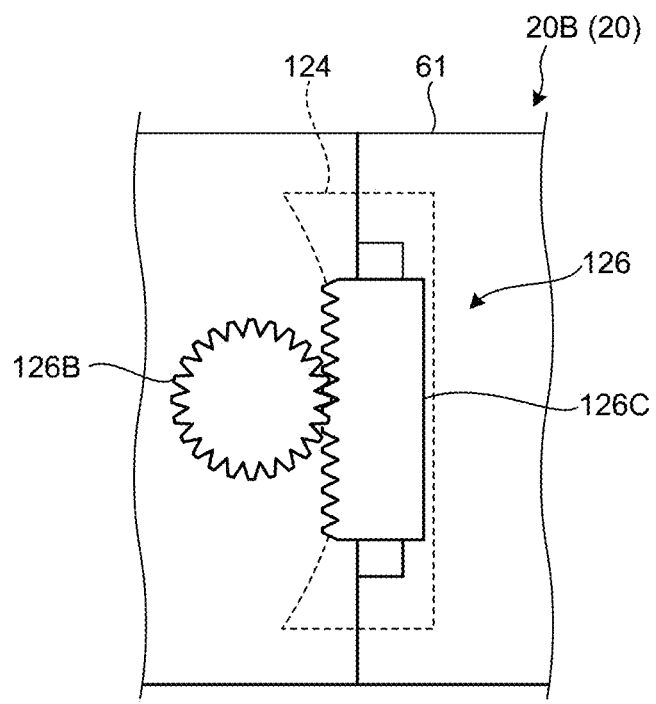
FIG. 11 is a schematic view when the driving part according to the first modification example is viewed from a side of the vehicle.

To achieve this feature, the back light unit 20B according to the modification example is provided with a driving part 126 configured to relatively move the field lens 124 relative to the light sources 122 to change an emission angle of light from the emission face of the field lens 124 (FIGS. 10 and 11). The driving part 126 illustrated in here is used to relatively move the field lens 124 relative to the light sources 122 in the vehicle upper and lower directions. For example, the driving part 126 includes an electric motor 126A serving as a drive source, a pinion gear 126B that is attached to and that is coaxial with an output shaft of the electric motor 126A, and a rack gear 126C that is fixed to the field lens 124 and that is engaging with the pinion gear 126B. The driving part 126 allows drive torque of the electric motor 126A to be transmitted via the pinion gear 126B to the rack gear 126C to move the rack gear 126C in one of the vehicle upper and lower directions to relatively move the field lens 124 to which the rack gear 126C is attached in the one of the vehicle upper and lower directions.

The controller 50 first detects, similar to the present embodiment, one of the eye boxes EB on the basis of a detection signal of the eye point detector 71.

Next, the controller 50 controls the driving part 126 to relatively move the field lens 124 to a position at which an emission angle of light from the emission face of the field lens 124 corresponds to an emission angle corresponding to the detection eye box EBd to adjust an emission angle of display light from the display unit 30B toward the reflection member 40 to an emission angle corresponding to the detection eye box EBd (FIGS. 1, 4, 6, 9, 12, and 13). The displaying part 10B exemplified in here is disposed closer to the rear of the vehicle than the reflection member 40 to emit display light toward the reflection member 40 disposed closer to the front of the vehicle. Therefore, the controller 50 controls the driving part 126 as described below.

When the detection eye box EBd corresponds to the first eye box EB1 disposed at the reference position, the controller 50 controls the driving part 126 to relatively move the field lens 124 to a reference lens position at which an emission angle of light from the emission face of the field lens 124 corresponds to an emission angle corresponding to the first eye box EB1 disposed at the reference position (FIG. 9). Therefore, display light reflected by the reflection member 40 is projected at the viewpoint position Pv1 corresponding to the first eye box EB1 on the projection target part Rwf.

Figure 12:
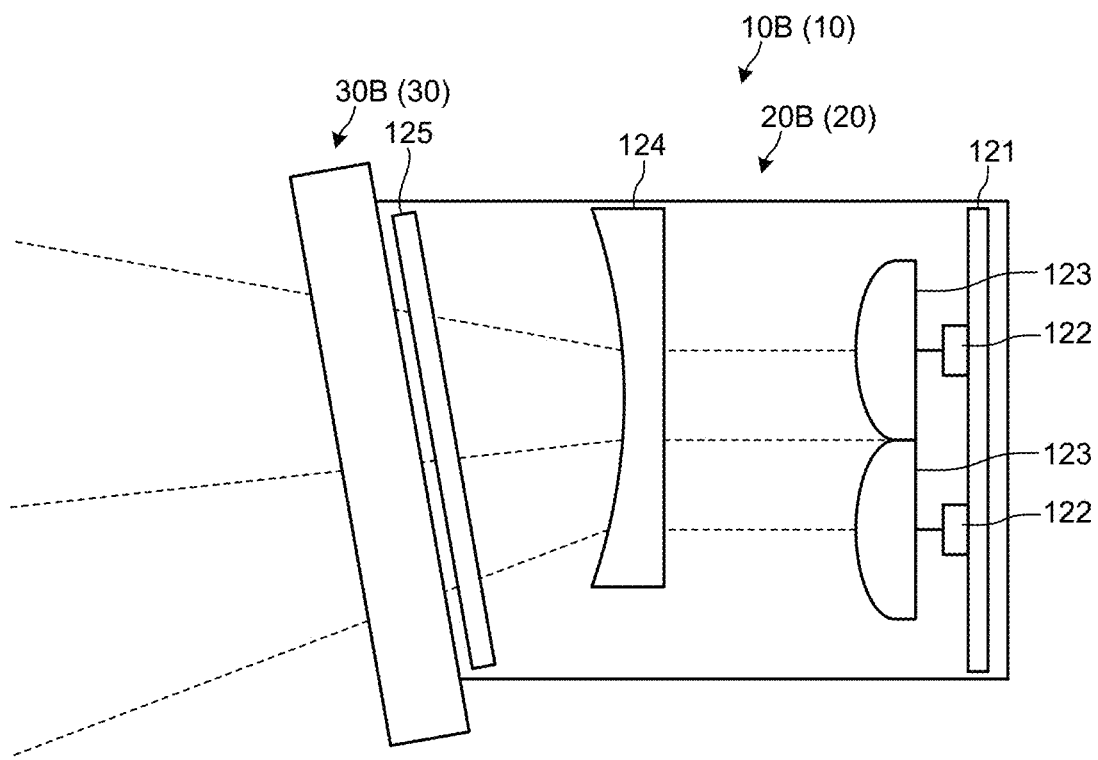
FIG. 12 is a schematic view illustrating the displaying part according to the first modification example, illustrating the control form with the second eye box disposed closer to the upper of the vehicle.
Figure 13:
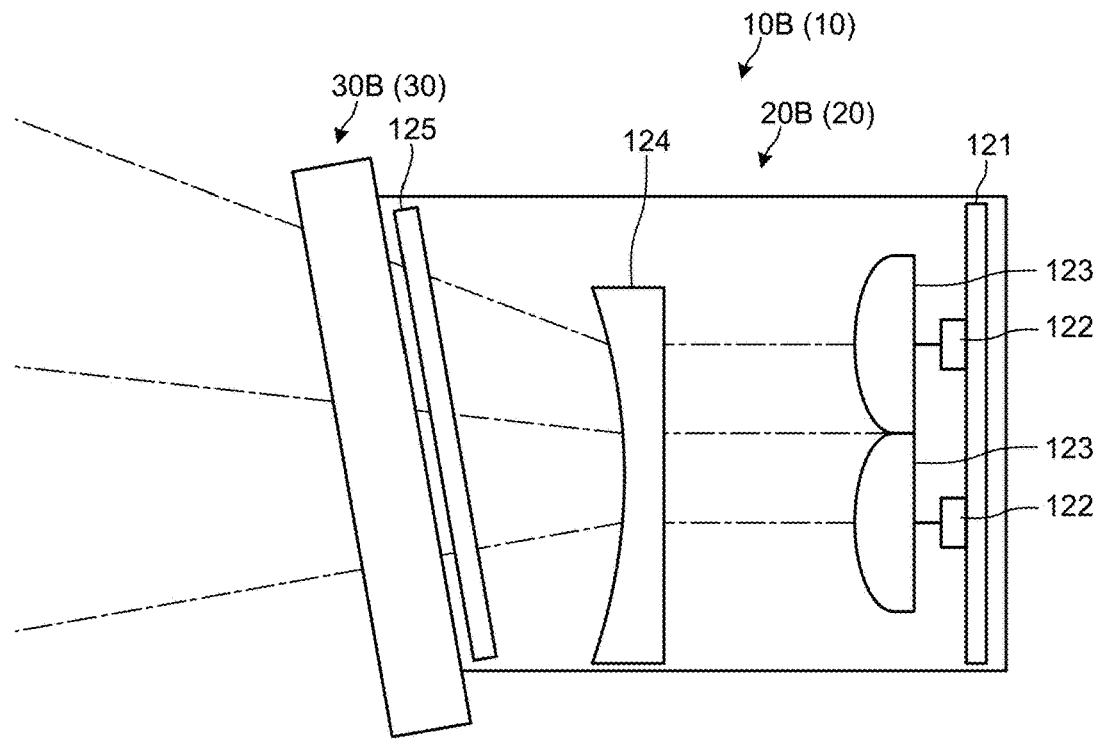
FIG. 13 is a schematic view illustrating the displaying part according to the first modification example, illustrating the control form with the third eye box disposed closer to the lower of the vehicle.

Furthermore, when the detection eye box EBd corresponds to the second eye box EB2 disposed closer to the upper of the vehicle, the controller 50 controls the driving part 126 to relatively move the field lens 124 toward a position closer to the upper of the vehicle than the reference lens position to adjust an emission angle of light from the emission face of the field lens 124 to an emission angle corresponding to the second eye box EB2 disposed closer to the upper of the vehicle (FIG. 12). Therefore, display light reflected by the reflection member 40 is projected at the viewpoint position Pv2 corresponding to the second eye box EB2 on the projection target part Rwf.

Furthermore, when the detection eye box EBd corresponds to the third eye box EB3 disposed closer to the lower of the vehicle, the controller 50 controls the driving part 126 to relatively move the field lens 124 toward a position closer to the lower of the vehicle than the reference lens position to adjust an emission angle of light from the emission face of the field lens 124 to an emission angle corresponding to the third eye box EB3 disposed closer to the lower of the vehicle (FIG. 12). Therefore, display light reflected by the reflection member 40 is projected at the viewpoint position Pv3 corresponding to the third eye box EB3 on the projection target part Rwf.

As illustrated above, the vehicle display device 2 according to the modification example controls the displaying part 10B for relatively moving the field lens 124 relative to the light sources 122 in accordance with the detection eye box EBd and for adjusting an emission angle of light from the emission face of the field lens 124 to an emission angle corresponding to the detection eye box EBd to adjust an emission angle of display light from the displaying part 10B toward the reflection member 40 to an emission angle corresponding to the detection eye box EBd to project display light reflected by the reflection member 40 at a viewpoint position corresponding to the detection eye box EBd on the projection target part Rwf. Therefore, the vehicle display device 2 makes it possible to provide clear virtual image display in accordance with the eye point of the occupant.

Furthermore, the vehicle display device 2 according to the modification example does not use a diffusion member having a greater diffusion angle, but is able to control the displaying part 10B for changing a position of the field lens 124 relative to the light sources 122 to diffuse light at a wider angle in accordance with a position of each of the eye boxes EB. Thus, there is a less decrease in luminance along with a change of each of the eye boxes EB, as can be seen in the conventional vehicle display devices, as well as there is no need to increase the output of the light sources 122. Therefore, the vehicle display device 2 makes it possible to suppress an increase in power consumption.

As described above, the vehicle display device 2 according to the modification example makes it possible to suppress an increase in power consumption, and to provide clear virtual image display in accordance with the eye point.

By the way, as to the relative movement directions of the field lens 124 relative to the light sources 122, the vehicle display device 2 according to the modification example may include a driving part making it possible to relatively move the field lens 124 in the vehicle width directions or/and vehicle front and rear directions, in addition to the vehicle upper and lower directions. In this case, in the vehicle display device 2, the controller 50 controls the driving part to relatively move the field lens 124 relative to the light sources 122 in the vehicle width directions or/and the vehicle front and rear directions, in addition to the vehicle upper and lower directions, making it possible to provide clear virtual image display in accordance with the eye point of the occupant.

Furthermore, the vehicle display device 2 according to the modification example may be configured, similar to the present embodiment, in such a manner that the reflection member 40 is provided with a rotation axis (not illustrated) having an axis line extending in the vehicle width directions, and the controller 50 rotates the reflection member 40 around the rotation axis. In addition, similar to the present embodiment, the controller 50 according to the modification example may rotate the reflection member 40 and perform such control as described above to project display light reflected by the reflection member 40 at a viewpoint position corresponding to the detection eye box EBd on the projection target part Rwf. In this case, the controller 50 may recognize the detection eye box EBd on the basis of a rotated position of the reflection member 40.

Note herein that the vehicle display device 2 exemplified in here is configured and disposed, similar to the vehicle display device 1 specifically exemplified in the present embodiment, in such a manner that the displaying part 10B is disposed closer to the rear of the vehicle than the reflection member 40, the displaying part 10B emits display light toward the reflection member 40 disposed closer to the front of the vehicle, and reflected light from the reflection member 40, which is based on the emission light, is inverted in the vehicle upper and lower directions and projected on the projection target part Rwf. However, the vehicle display device 2 according to the modification example may be configured and disposed as described below.

For example, the vehicle display device 2 according to the modification example may be configured and disposed (not illustrated), similar to the one illustrated as another form of the vehicle display device 1 in the present embodiment, in such a manner that the displaying part 10B is disposed closer to the front of the vehicle and the lower of the vehicle than the first reflection member 40, a second reflection member is disposed closer to the front of the vehicle than the first reflection member 40, the displaying part 10B emits display light toward the first reflection member 40, reflected light from the first reflection member 40, which is based on the emission light, is inverted in the vehicle upper and lower directions by the second reflection member and projected, and reflected light from the second reflection member, which is based on the projection light, is inverted in the vehicle upper and lower directions and projected on the projection target part Rwf. Even in this case, the controller 50 controls the driving part 126, similar to the example described above.

Furthermore, for example, the vehicle display device 2 according to the modification example may be configured and disposed (not illustrated), similar to the one illustrated as another form of the vehicle display device 1 in the present embodiment, in such a manner that the displaying part 10B is disposed closer to the front of the vehicle than the reflection member 40, the displaying part 10B emits display light toward the reflection member 40 disposed closer to the rear of the vehicle, and reflected light from the reflection member 40, which is based on the emission light, is not inverted in the vehicle upper and lower directions, but projected on the projection target part Rwf. Furthermore, the vehicle display device 2 according to the modification example may be configured and disposed (not illustrated), similar to the one illustrated as another form of the vehicle display device 1 in the present embodiment, in such a manner that the displaying part 10B is disposed closer to the rear of the vehicle than the first reflection member 40, a second reflection member is disposed closer to the rear of the vehicle and the upper of the vehicle than the first reflection member 40, the displaying part 10B emits display light toward the first reflection member 40 disposed closer to the front of the vehicle, reflected light from the first reflection member 40, which is based on the emission light, is not inverted in the vehicle upper and lower directions by the second reflection member, but projected, and reflected light from the second reflection member, which is based on the projection light, is not inverted in the vehicle upper and lower directions, but projected on the projection target part Rwf.

Even when configured and disposed as described above, when the detection eye box EBd corresponds to the first eye box EB1 disposed at the reference position, the controller 50 controls the driving part 126 to relatively move the field lens 124 at the reference lens position at which an emission angle of light from the emission face of the field lens 124 corresponds to an emission angle corresponding to the first eye box EB1 disposed at the reference position.

On the other hand, when the detection eye box EBd corresponds to the second eye box EB2 disposed closer to the upper of the vehicle, in order to suppress a virtual image from being inverted in the vehicle upper and lower directions, the controller 50 controls the driving part 126 to relatively move the field lens 124 to a position closer to the lower of the vehicle than the reference lens position to adjust an emission angle of light from the emission face of the field lens 124 to an emission angle corresponding to the second eye box EB2 disposed closer to the upper of the vehicle. Furthermore, when the detection eye box EBd corresponds to the third eye box EB3 disposed closer to the lower of the vehicle, in order to suppress a virtual image from being inverted in the vehicle upper and lower directions, the controller 50 controls the driving part 126 to relatively move the field lens 124 to a position closer to the upper of the vehicle than the reference lens position to adjust an emission angle of light from the emission face of the field lens 124 to an emission angle corresponding to the third eye box EB3 disposed closer to the lower of the vehicle.

Note that, although the vehicle display device 2 according to the modification example has been illustrated, where such control as described above is performed on the basis of the detection eye box EBd, such control as described above may be performed on the basis of a detection eye point detected from a detection signal of the eye point detector 71. In this case, the eye box described above is read as an eye point.

Second Modification Example

Next, the vehicle display device 3 according to the second modification example will now be described herein.

Figure 14:
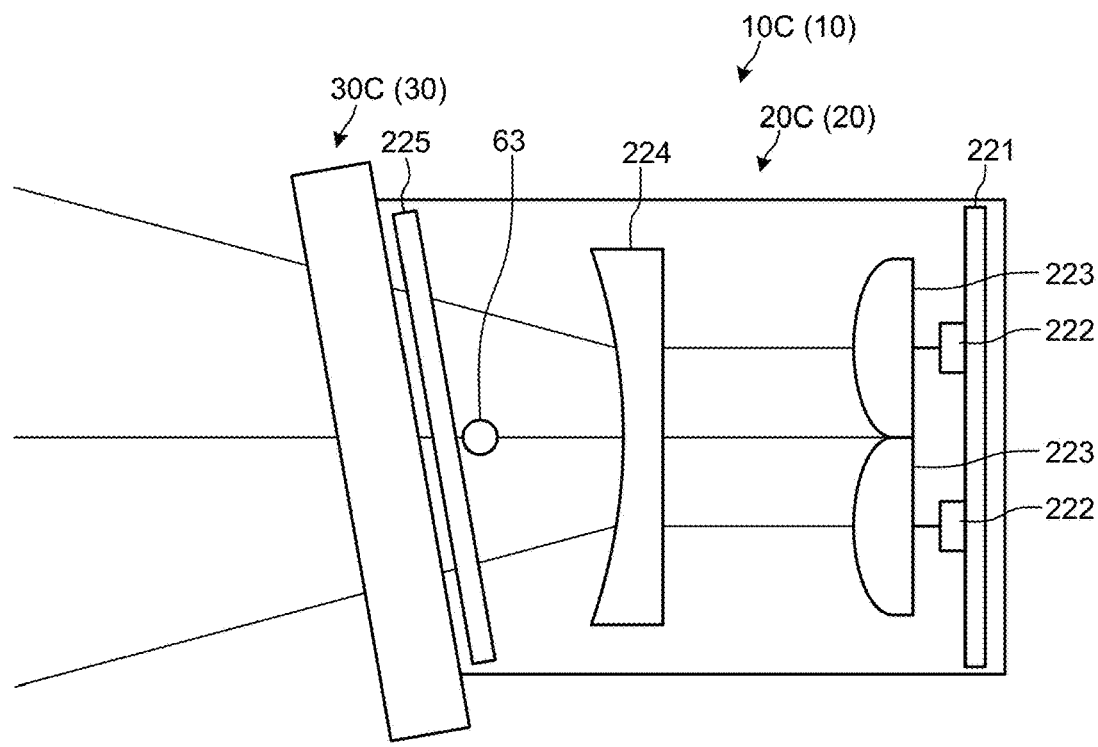
FIG. 14 is a schematic view illustrating a displaying part according to the second modification example, illustrating the control form with the first eye box disposed at the reference position.

In the vehicle display device 3 according to the modification example, the displaying part 10 including the back light unit 20 and the display unit 30 is configured as a displaying part 10C including a back light unit 20C and a display unit 30C, as described below (FIG. 14).

The back light unit 20C according to the modification example includes a substrate 221, a plurality of light sources 222, a plurality of collecting lenses 223, a field lens 224, and a diffusion member 225 (FIG. 14). In the back light unit 20C, the collecting lenses 223 collect emission light from the light sources 222. The emission light from the collecting lenses 223 then enters the field lens 224. In the back light unit 20C, the field lens 224 refracts the incident light. Emission light aligned in the advancing direction by the field lens 224 enters the diffusion member 225. The diffusion member 225 diffuses the incident light at a wide angle preferable for the display unit 30C. The diffused light is then emitted toward the display unit 30C.

The substrate 221 is a member for fixing the light sources 222. The substrate 221 is formed into a rectangular flat plate shape, similar to the substrate 121 according to the first modification example. The light sources 222 are fixed to one plane (FIG. 14).

As the light sources 222, a plurality of light emitting diodes are used, similar to the light sources 122 according to the first modification example. The controller 50 controls and causes the light sources to turn on or off, as well as controls the output of emission light when the light sources are caused to turn on. The light sources 222 according to the modification example are arranged, similar to the light sources 122 according to the first modification example, two in the vehicle upper and lower directions by three in the vehicle width directions.

The collecting lenses 223 are lens members made of glass or transparent resin that collect light from the light sources 222, and are respectively provided to correspond to the light sources 222. The collecting lenses 223 according to the modification example are each formed into an identical plane convex lens to that of the collecting lenses 123 according to the first modification example. Their flat incidence faces are respectively disposed to face light emission parts of the light sources 222, and their convex emission faces are disposed to face the display unit 30C. Light from the light sources 222 via the collecting lenses 223 may enter regions divided on a back face of the display unit 30C, or may enter in an overlapped manner part or whole of the regions adjacent to each other.

The field lens 224 is a lens member made of glass or transparent resin that aligns, in the advancing direction, light emitted from the collecting lenses 223, and is disposed between all of the collecting lenses 223 and the display unit 30C. The field lens 224 according to the modification example is formed into an identical plane concave lens to that of the field lens 124 according to the first modification example. Its flat incidence face is disposed to face the emission faces of all the collecting lenses 223, and its concave emission face is disposed to face the display unit 30C.

The diffusion member 225 is an optical element such as a diffusion plate that diffuses light emitted from the field lens 224 toward the whole of each of the eye boxes EB, and is disposed between the field lens 224 and the display unit 30C. The diffusion member 225 according to the modification example is identical to the diffusion member 125 according to the first modification example, where one plane (an incidence face) is disposed to face the emission face of the field lens 224, and another plane (an emission face) is disposed to face the back face of the display unit 30C.

For the back light unit 20C, similar to the present embodiment and the first modification example, it is possible to increase its efficiency when light is diffused toward the whole of each of the eye boxes EB by using, together with the diffusion member 225, such an element as a lens array that its diffusion characteristic is a top-hat type, for example.

In the back light unit 20C, light emitted from the diffusion member 225 serves as emission light emitted toward the display unit 30C.

The display unit 30C according to the modification example is identical to the display unit 30A according to the present embodiment (the display unit 30B according to the first modification example) described above. In addition, the vehicle display device 3 according to the modification example is configured and disposed, similar to the vehicle display device 1 specifically exemplified in the present embodiment, in such a manner that the displaying part 10C is disposed closer to the rear of the vehicle than the reflection member 40, the displaying part 10C emits display light toward the reflection member 40 disposed closer to the front of the vehicle, and reflected light from the reflection member 40, which is based on the emission light, is inverted in the vehicle upper and lower directions and projected on the projection target part Rwf.

The vehicle display device 3 is configured to allow the controller 50 to perform control as described below in order to provide clear virtual image display regardless of the eye point of the occupant.

The controller 50 relatively rotates the displaying part 10C relative to a vehicle body on the basis of the detection eye box EBd representing a detection result of one of the eye boxes EB to control display light in accordance with the detection eye box EBd (FIGS. 1, 4, and 6). The controller 50 illustrated in here detects one of the eye boxes EB, which corresponds to the eye point of the occupant, to relatively rotate the displaying part 10C on the basis of the detection eye box EBd.

To achieve this feature, the vehicle display device 3 according to the modification example is provided with a driving part 80 configured to relatively rotate the displaying part 10C relative to the vehicle body (FIGS. 15 to 18). The driving part 80 relatively rotates the displaying part 10C relative to the vehicle body around a rotation axis 63 having an axis line extending in the vehicle width directions to change an emission angle of display light from the displaying part 10C. In here, the rotation axis 63 is provided to the housing 61 of the back light unit 20C. While the back light unit 20C is relatively rotated, the display unit 30C fixed to the housing 61 of the back light unit 20C is also relatively rotated.

Figure 15:
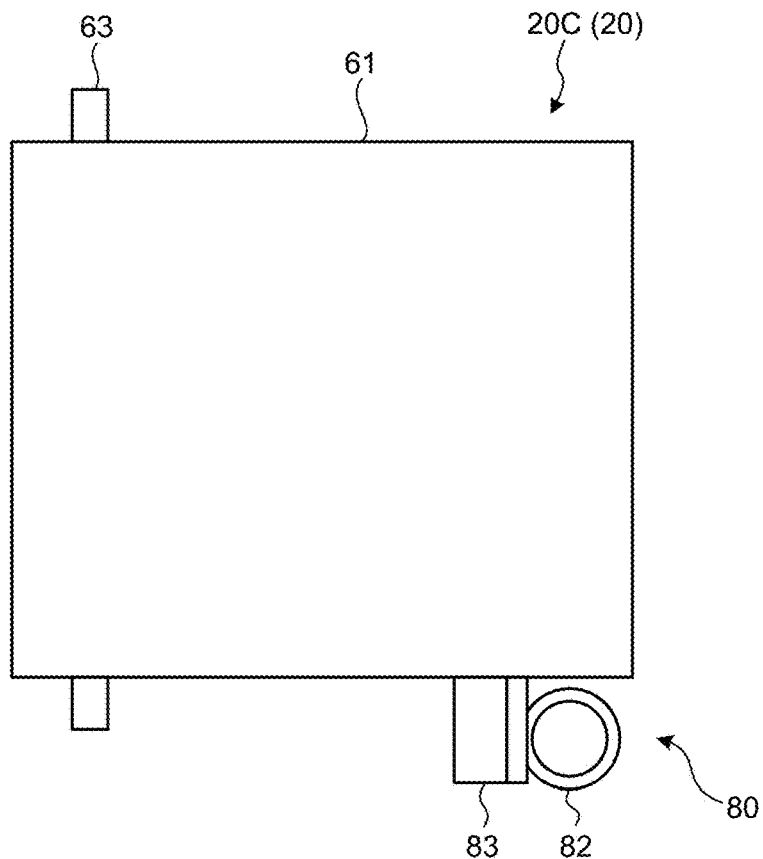
FIG. 15 is a schematic view when a driving part according to the second modification example is viewed from above the vehicle.
Figure 16:
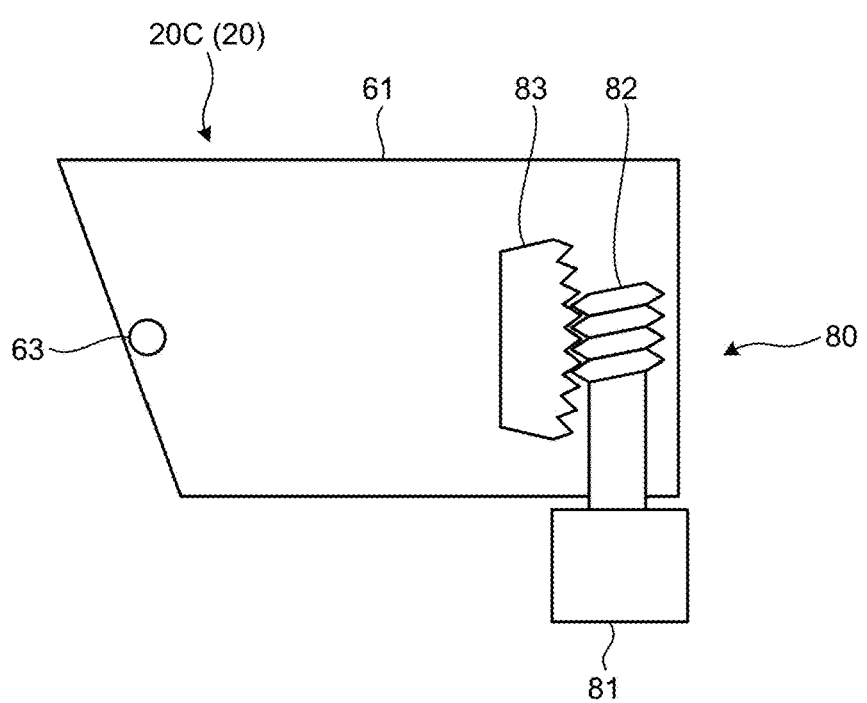
FIG. 16 is a schematic view when the driving part according to the second modification example is viewed from the side of the vehicle.

For example, the driving part 80 includes an electric motor 81 serving as a drive source, a worm gear 82 that is attached to and that is coaxial with an output shaft of the electric motor 81, and a rack gear 83 that is fixed to the housing 61 of the back light unit 20C and that is engaging with the worm gear 82 (FIGS. 15 and 16). On the rack gear 83, a plurality of teeth are arranged on its outside in a radial direction, when viewed from the axis line of the rotation axis 63, in a convex arc shape on the outside. The driving part 80 allows drive torque of the electric motor 81 to be transmitted via the worm gear 82 to the rack gear 83 to rotate the rack gear 83 around the rotation axis 63 in one of the vehicle upper and lower directions to relatively rotate the housing 61 to which the rack gear 83 is attached around the rotation axis 63.

Figure 17:
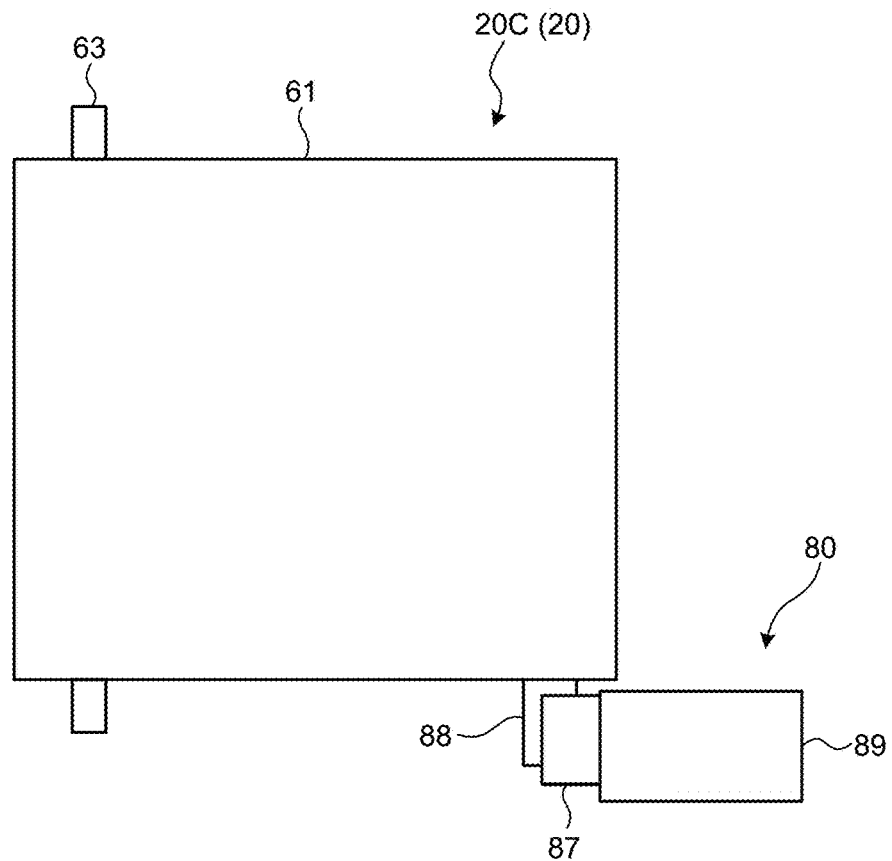
FIG. 17 is a schematic view when another form of the driving part according to the second modification example is viewed from above the vehicle.
Figure 18:
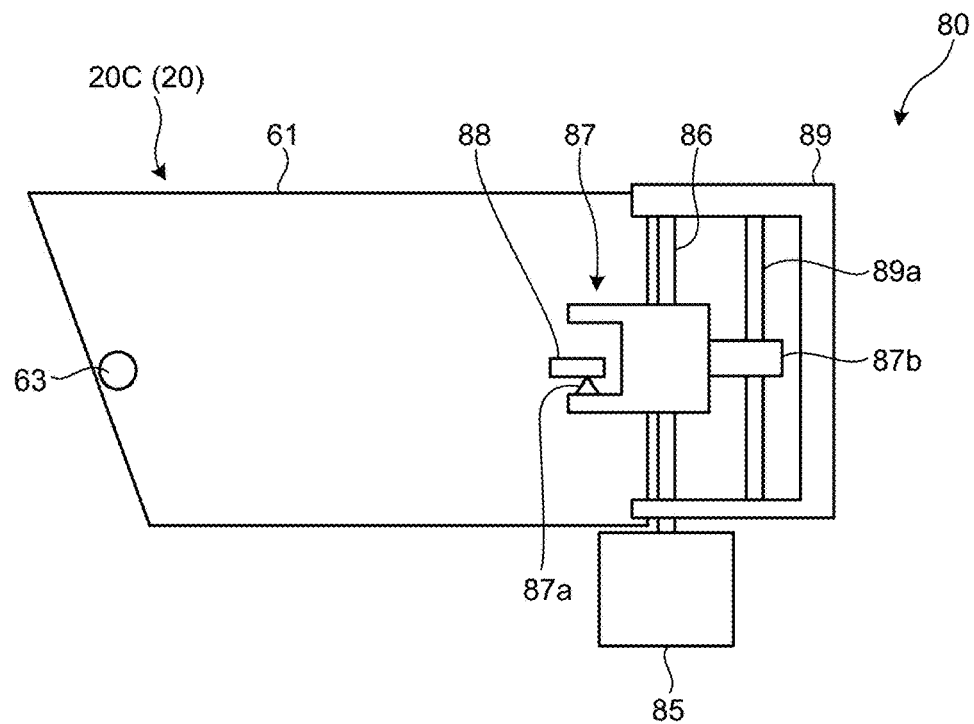
FIG. 18 is a schematic view when the other form of the driving part according to the second modification example is viewed from the side of the vehicle.

Furthermore, the driving part 80 may include an electric motor 85 serving as a drive source, a male thread part 86 formed on an output shaft of the electric motor 85, a power transmitting tool 87 having a female thread part (not illustrated) screwed with the male thread part 86, a transmitted power receiving part 88 that is provided to the housing 61 of the back light unit 20C and that receives a force from the power transmitting tool 87, and a guide tool 89 that guides the power transmitting tool 87 in the vehicle upper and lower directions (FIGS. 17 and 18). The power transmitting tool 87 includes a power transmitting part 87a having a protrusion shape protruding toward the upper of the vehicle or the lower of the vehicle, and transmits a force from the power transmitting part 87a to the transmitted power receiving part 88. Furthermore, the power transmitting tool 87 includes a guide target part 87b that is to be guided in the vehicle upper and lower directions along a guide shaft 89a of the guide tool 89. The power transmitting part 87a illustrated in here protrudes toward the upper of the vehicle. In the power transmitting tool 87, when an axial force generated by the male thread part 86 and the female thread part acts toward the upper of the vehicle, the power transmitting part 87a pushes up the transmitted power receiving part 88 toward the upper of the vehicle, and the housing 61 to which the transmitted power receiving part 88 is attached is relatively rotated around the rotation axis 63. In addition, in the power transmitting tool 87, when an axial force generated by the male thread part 86 and the female thread part acts toward the lower of the vehicle, a force acting from the power transmitting part 87a to the transmitted power receiving part 88 disappears, the power transmitting part 87a moves toward the lower of the vehicle, the transmitted power receiving part 88 also moves toward the lower of the vehicle, and the housing 61 to which the transmitted power receiving part 88 is attached is relatively rotated around the rotation axis 63.

The controller 50 first detects, similar to the present embodiment and the first modification example, one of the eye boxes EB on the basis of a detection signal of the eye point detector 71.

Next, the controller 50 controls the driving part 80 to relatively rotate the displaying part 10C to a position at which an emission angle of display light from the display unit 30C toward the reflection member 40 corresponds to an emission angle corresponding to the detection eye box EBd (FIGS. 1, 4, 6, 14, 19, and 20). The displaying part 10C exemplified in here is disposed closer to the rear of the vehicle than the reflection member 40 to emit display light toward the reflection member 40 disposed closer to the front of the vehicle. Therefore, the controller 50 controls the driving part 80 as described below.

When the detection eye box EBd corresponds to the first eye box EB1 disposed at the reference position, the controller 50 controls the driving part 80 to relatively rotate the displaying part 10C to a reference displaying part position at which an emission angle of display light from the display unit 30C toward the reflection member 40 corresponds to an emission angle corresponding to the first eye box EB1 disposed at the reference position (FIG. 14). Therefore, display light reflected by the reflection member 40 is projected at the viewpoint position Pv1 corresponding to the first eye box EB1 on the projection target part Rwf.

Figure 19:
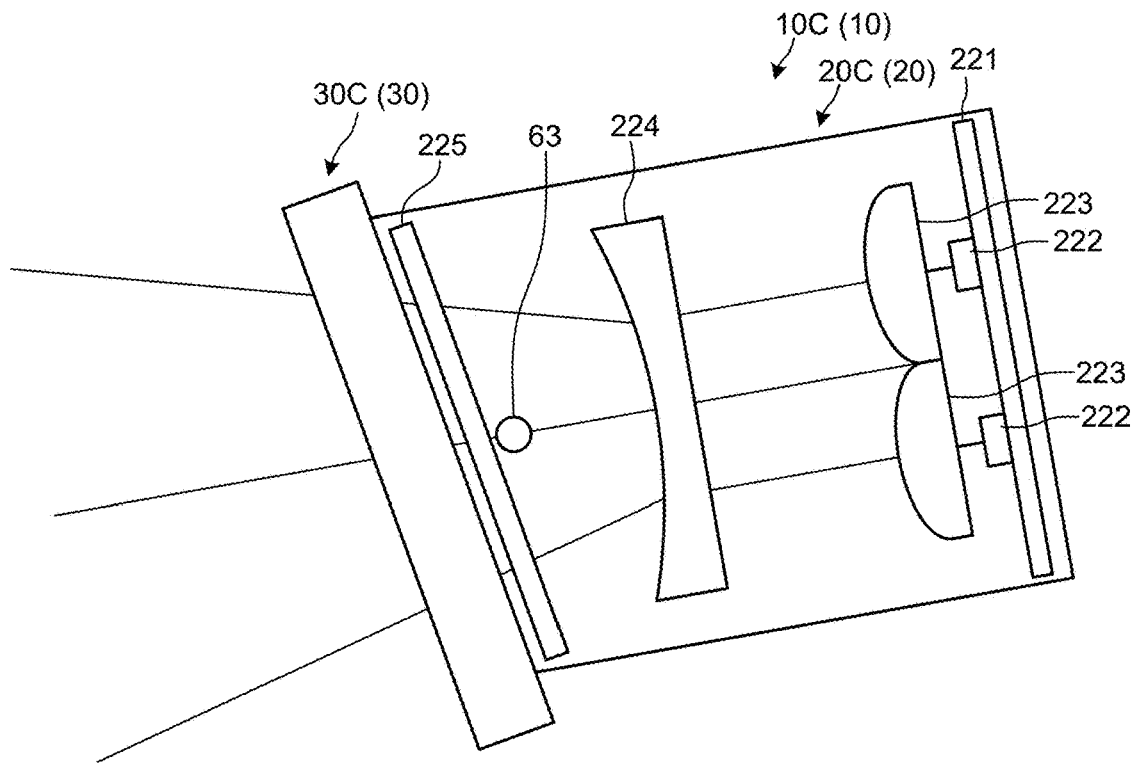
FIG. 19 is a schematic view illustrating the displaying part according to the second modification example, illustrating the control form with the second eye box disposed closer to the upper of the vehicle.

Furthermore, when the detection eye box EBd corresponds to the second eye box EB2 disposed closer to the upper of the vehicle, the controller 50 controls the driving part 80 to relatively rotate the displaying part 10C to allow a front face of the display unit 30C to face a position closer to the lower of the vehicle than the reference displaying part position to adjust an emission angle of display light from the display unit 30C toward the reflection member 40 to an emission angle corresponding to the second eye box EB2 disposed closer to the upper of the vehicle (FIG. 19). Therefore, display light reflected by the reflection member 40 is projected at the viewpoint position Pv2 corresponding to the second eye box EB2 on the projection target part Rwf.

Figure 20:
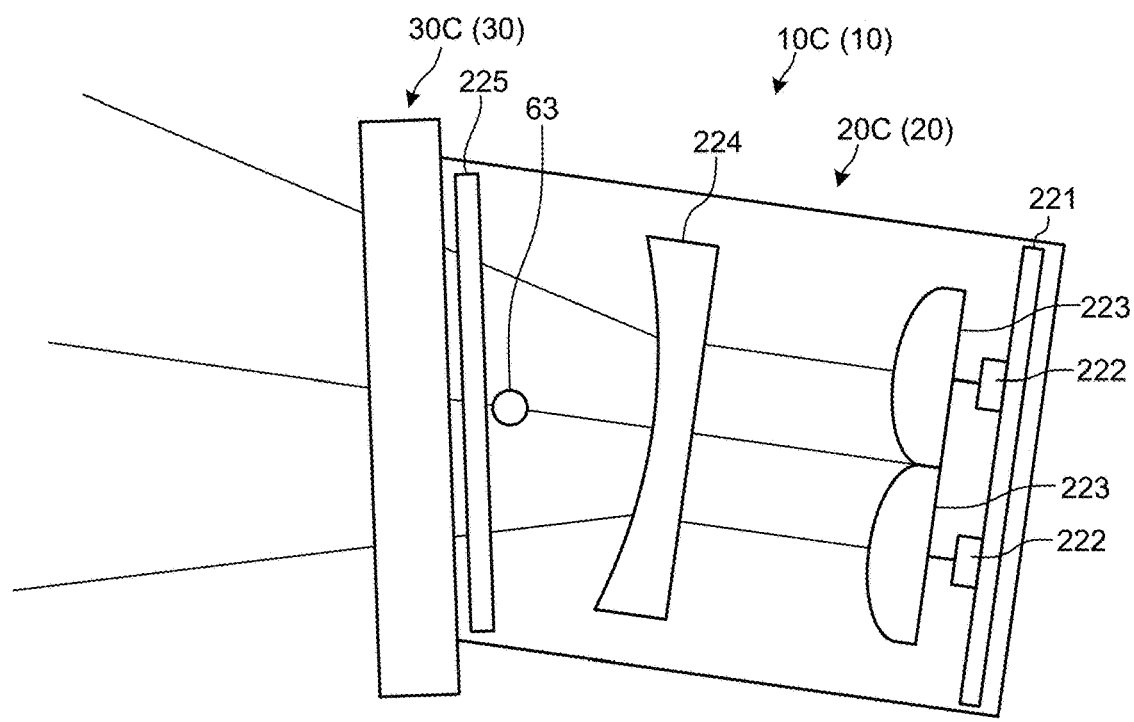
FIG. 20 is a schematic view illustrating the displaying part according to the second modification example, illustrating the control form with the third eye box disposed closer to the lower of the vehicle.

Furthermore, when the detection eye box EBd corresponds to the third eye box EB3 disposed closer to the lower of the vehicle, the controller 50 controls the driving part 80 to relatively rotate the displaying part 10C to allow the front face of the display unit 30C to face a position closer to the upper of the vehicle than the reference displaying part position to adjust an emission angle of display light from the display unit 30C toward the reflection member 40 to an emission angle corresponding to the third eye box EB3 disposed closer to the lower of the vehicle (FIG. 20). Therefore, display light reflected by the reflection member 40 is projected at the viewpoint position Pv3 corresponding to the third eye box EB3 on the projection target part Rwf.

As illustrated above, the vehicle display device 3 according to the modification example controls the displaying part 10C for relatively moving the displaying part 10C relative to the vehicle body in accordance with the detection eye box EBd to adjust an emission angle of display light from the displaying part 10C toward the reflection member 40 to an emission angle corresponding to the detection eye box EBd to project display light reflected by the reflection member 40 at a viewpoint position corresponding to the detection eye box EBd on the projection target part Rwf. Therefore, the vehicle display device 3 makes it possible to provide clear virtual image display in accordance with the eye point of the occupant.

Furthermore, the vehicle display device 3 according to the modification example does not use a diffusion member having a greater diffusion angle, but is able to control the displaying part 10C for relatively rotating the displaying part 10C relative to the vehicle body, and for changing the orientation of the front face of the display unit 30C of the displaying part 10C to diffuse light at a wider angle in accordance with a position of each of the eye boxes EB. Thus, there is a less decrease in luminance along with a change of each of the eye boxes EB, as can be seen in the conventional vehicle display devices, as well as there is no need to increase the output of the light sources 222. Therefore, the vehicle display device 3 makes it possible to suppress an increase in power consumption.

As described above, the vehicle display device 3 according to the modification example makes it possible to suppress an increase in power consumption, and to provide clear virtual image display in accordance with the eye point.

By the way, the vehicle display device 3 according to the modification example may be configured in such a manner that the position of the display unit 30C relative to the vehicle body is fixed, and the back light unit 20C is relatively rotated relative to the vehicle body, as described above. In this case, the controller 50 relatively rotates the back light unit 20C to adjust an emission angle of emission light from the back light unit 20C to an emission angle corresponding to the detection eye box EBd to adjust an emission angle of display light from the displaying part 10C (the display unit 30C) toward the reflection member 40 to an emission angle corresponding to the detection eye box EBd to project display light reflected by the reflection member 40 at a viewpoint position corresponding to the detection eye box EBd on the projection target part Rwf.

Furthermore, the vehicle display device 3 according to the modification example may be configured in such a manner that the position of the display unit 30C relative to the vehicle body and the positions of the housing 61 and the diffusion member 225 of the back light unit 20C relative to the vehicle body are fixed, and the substrate 221, the light sources 222, the collecting lenses 223, and the field lens 224 in the back light unit 20C are relatively rotated together relative to the vehicle body. In this case, the controller 50 relatively rotates the substrate 221, the light sources 222, the collecting lenses 223, and the field lens 224 together relative to the vehicle body to adjust an emission angle of emission light from the back light unit 20C to an emission angle corresponding to the detection eye box EBd to adjust an emission angle of display light from the displaying part 10C (the display unit 30C) toward the reflection member 40 to an emission angle corresponding to the detection eye box EBd to project display light reflected by the reflection member 40 at a viewpoint position corresponding to the detection eye box EBd on the projection target part Rwf.

Furthermore, the vehicle display device 3 according to the modification example may be configured, similar to the present embodiment and the first modification example, in such a manner that the reflection member 40 is provided with a rotation axis (not illustrated) having an axis line extending in the vehicle width directions, and the controller 50 rotates the reflection member 40 around the rotation axis. In addition, the controller 50 according to the modification example may, similar to the present embodiment, rotate the reflection member 40 and perform such control as described above to project display light reflected by the reflection member 40 at a viewpoint position corresponding to the detection eye box EBd on the projection target part Rwf. In this case, the controller 50 may recognize the detection eye box EBd on the basis of a rotated position of the reflection member 40.

Note herein that the vehicle display device 3 exemplified in here is configured and disposed, similar to the vehicle display device 1 specifically exemplified in the present embodiment, for example, in such a manner that the displaying part 10C is disposed closer to the rear of the vehicle than the reflection member 40, the displaying part 10C emits display light toward the reflection member 40 disposed closer to the front of the vehicle, and reflected light from the reflection member 40, which is based on the emission light, is inverted in the vehicle upper and lower directions and projected on the projection target part Rwf. However, the vehicle display device 3 according to the modification example may be configured and disposed as described below.

For example, the vehicle display device 3 according to the modification example may be configured and disposed (not illustrated), similar to the one illustrated as another form of the vehicle display device 1 in the present embodiment, in such a manner that the displaying part 10C is disposed closer to the front of the vehicle and the lower of the vehicle than the first reflection member 40, a second reflection member is disposed closer to the front of the vehicle than the first reflection member 40, the displaying part 10C emits display light toward the first reflection member 40, reflected light from the first reflection member 40, which is based on the emission light, is inverted in the vehicle upper and lower directions by the second reflection member and projected, and reflected light from the second reflection member, which is based on the projection light, is inverted in the vehicle upper and lower directions and projected on the projection target part Rwf. Even in this case, the controller 50 controls the driving part 80, similar to the example described above.

Furthermore, for example, the vehicle display device 3 according to the modification example may be configured and disposed (not illustrated), similar to the one illustrated as another form of the vehicle display device 1 in the present embodiment, in such a manner that the displaying part 10C is disposed closer to the front of the vehicle than the reflection member 40, the displaying part 10C emits display light toward the reflection member 40 disposed closer to the rear of the vehicle, reflected light from the reflection member 40, which is based on the emission light, is not inverted in the vehicle upper and lower directions, but projected on the projection target part Rwf. Furthermore, the vehicle display device 3 according to the modification example may be configured and disposed (not illustrated), similar to the one illustrated as another form of the vehicle display device 1 in the present embodiment, in such a manner that the displaying part 10C is disposed closer to the rear of the vehicle than the first reflection member 40, a second reflection member is disposed closer to the rear of the vehicle and the upper of the vehicle than the first reflection member 40, the displaying part 10C emits display light toward the first reflection member 40 disposed closer to the front of the vehicle, reflected light from the first reflection member 40, which is based on the emission light, is not inverted in the vehicle upper and lower directions by the second reflection member, but projected, and reflected light from the second reflection member, which is based on the projection light, is not inverted in the vehicle upper and lower directions, but projected on the projection target part Rwf.

Even when configured and disposed as described above, when the detection eye box EBd corresponds to the first eye box EB1 disposed at the reference position, the controller 50 controls the driving part 80 to relatively rotate the displaying part 10C to the reference displaying part position at which an emission angle of display light from the display unit 30C toward the reflection member 40 corresponds to an emission angle corresponding to the first eye box EB1 disposed at the reference position.

On the other hand, when the detection eye box EBd corresponds to the second eye box EB2 disposed closer to the upper of the vehicle, the controller 50 controls the driving part 80 to relatively rotate the displaying part 10C to allow the front face of the display unit 30C to face a position closer to the upper of the vehicle than the reference displaying part position to adjust an emission angle of display light from the display unit 30C toward the reflection member 40 to an emission angle corresponding to the second eye box EB2 disposed closer to the upper of the vehicle. Furthermore, when the detection eye box EBd corresponds to the third eye box EB3 disposed closer to the lower of the vehicle, the controller 50 controls the driving part 80 to relatively rotate the displaying part 10C to allow the front face of the display unit 30C to face a position closer to the lower of the vehicle than the reference displaying part position to adjust an emission angle of display light from the display unit 30C toward the reflection member 40 to an emission angle corresponding to the third eye box EB3 disposed closer to the lower of the vehicle.

Note that, although the vehicle display device 3 according to the modification example has been illustrated, where such control as described above is performed on the basis of the detection eye box EBd, such control as described above may be performed on the basis of a detection eye point detected from a detection signal of the eye point detector 71. In this case, the eye box described above is read as an eye point.

The vehicle display device according to the present embodiment controls the displaying part to adjust an emission angle of display light from the displaying part toward the reflection member to an emission angle corresponding to a detection eye point or a detection eye box to project the display light reflected by the reflection member at a viewpoint position corresponding to the detection eye point or the detection eye box on the projection target part, making it possible to provide clear virtual image display in accordance with the eye point of the occupant. Furthermore, the vehicle display device according to the present embodiment does not use a diffusion member having a greater diffusion angle, but is able to control the displaying part to diffuse light at a wide angle in accordance with a position of each of a plurality of eye points or a plurality of eye boxes. Thus, there is a less decrease in luminance along with a change of each of the eye points or eye boxes, as can be seen in the conventional vehicle display devices, as well as there is no need to increase the output of the light sources. Therefore, the vehicle display device makes it possible to suppress an increase in power consumption. As described above, the vehicle display device according to the present embodiment makes it possible to suppress an increase in power consumption, and to provide clear virtual image display in accordance with the eye point.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
 a displaying part configured to emit, as display light, display information to be viewed and recognized by an occupant in a cabin as a virtual image;
 a reflection member configured to reflect the display light emitted from the displaying part to project the display light on a projection target part in the cabin; and
 a controller configured to control the display light in accordance with a detection eye point representing a detection result of an eye point of the occupant or a detection eye box representing a detection result of an eye box representing a range of the eye point, the eye box allowing the virtual image to be viewed and recognized, wherein
 the controller controls the displaying part to adjust an emission angle of the display light from the displaying part toward the reflection member in accordance with the detection eye point or the detection eye box to project the display light reflected by the reflection member at a viewpoint position corresponding to the detection eye point or the detection eye box on the projection target part, the displaying part includes a back light unit and a display unit having a back face and a front face, the back face allowing emission light of the back light unit to enter, the front face allowing the display light corresponding to incident light from the back face to be emitted toward the reflection member, the back light unit includes a housing, a light source inside of the housing, a collecting lens inside of the housing, and a field lens inside of the housing and having an incidence face and an emission face, the emission face allowing light entering the incidence face from the light source to exit toward the display unit, light emitted from the light source is incident on the collecting lens and light emitted from the collecting lens is incident on the incidence face, and the reflection member is outside of the housing.

2. The vehicle display device according to claim 1, wherein
the emission face being a concave, curved face,
the back light unit includes a driving part configured to relatively move the field lens relative to the light source to change an emission angle of light from the emission face, and
the controller controls the driving part to relatively move the field lens to a position at which the emission angle of the light from the emission face corresponds to an emission angle corresponding to the detection eye point or the detection eye box to adjust the emission angle of the display light from the display unit toward the reflection member to the emission angle corresponding to the detection eye point or the detection eye box.

3. The vehicle display device according to claim 2, wherein,
when the displaying part is disposed closer to a rear of a vehicle than the reflection member, the displaying part emits the display light toward the reflection member disposed closer to a front of the vehicle, and reflected light from the reflection member, the reflected light being based on the emission light, is inverted in vehicle upper and lower directions and projected on the projection target part, or, when the displaying part is disposed closer to the front of the vehicle and a lower of the vehicle than a first reflection member serving as the reflection member, a second reflection member is disposed closer to the front of the vehicle than the first reflection member, the displaying part emits the display light toward the first reflection member, reflected light from the first reflection member, the reflected light being based on the emission light, is inverted in the vehicle upper and lower directions by the second reflection member and projected, and reflected light from the second reflection member, the reflected light being based on the projection light, is inverted in the vehicle upper and lower directions and projected on the projection target part,
the controller
controls, when the detection eye point corresponds to an eye point disposed at a reference position or the detection eye box corresponds to an eye box disposed at a reference position, the driving part to relatively move the field lens to a reference lens position at which the emission angle of the light from the emission face corresponds to an emission angle corresponding to the eye point disposed at the reference position or the eye box disposed at the reference position,
controls, when the detection eye point corresponds to an eye point disposed closer to an upper of the vehicle than the eye point disposed at the reference position or the detection eye box corresponds to an eye box disposed closer to the upper of the vehicle than the eye box disposed at the reference position, the driving part to relatively move the field lens to a position closer to the upper of the vehicle than the reference lens position to adjust the emission angle of the light from the emission face to an emission angle corresponding to the eye point disposed closer to the upper of the vehicle or the eye box disposed closer to the upper of the vehicle, and
controls, when the detection eye point corresponds to an eye point disposed closer to a lower of the vehicle than the eye point disposed at the reference position or the detection eye box corresponds to an eye box disposed closer to the lower of the vehicle than the eye box disposed at the reference position, the driving part to relatively move the field lens to a position closer to the lower of the vehicle than the reference lens position to adjust the emission angle of the light from the emission face to an emission angle corresponding to the eye point disposed closer to the lower of the vehicle or the eye box disposed closer to the lower of the vehicle.

4. The vehicle display device according to claim 2, wherein,
when the displaying part is disposed closer to a front of the vehicle than the reflection member, the displaying part emits the display light toward the reflection member disposed closer to a rear of the vehicle, and reflected light from the reflection member, the reflected light being based on the emission light, is not inverted in vehicle upper and lower directions, but projected on the projection target part, or, when the displaying part is disposed closer to the rear of the vehicle than a first reflection member serving as the reflection member, a second reflection member is disposed closer to the rear of the vehicle and an upper of the vehicle than the first reflection member, the displaying part emits the display light toward the first reflection member disposed closer to the front of the vehicle, reflected light from the first reflection member, the reflected light being based on the emission light, is not inverted in the vehicle upper and lower directions by the second reflection member, but projected, and reflected light from the second reflection member, the reflected light being based on the projection light, is not inverted in the vehicle upper and lower directions, but projected on the projection target part,
the controller
controls, when the detection eye point corresponds to an eye point disposed at a reference position or the detection eye box corresponds to an eye box disposed at a reference position, the driving part to relatively move the field lens to a reference lens position at which the emission angle of the light from the emission face corresponds to an emission angle corresponding to the eye point disposed at the reference position or the eye box disposed at the reference position,
controls, when the detection eye point corresponds to an eye point disposed closer to an upper of the vehicle than the eye point disposed at the reference position or the detection eye box corresponds to an eye box disposed closer to the upper of the vehicle than the eye box disposed at the reference position, the driving part to relatively move the field lens to a position closer to a lower of the vehicle than the reference lens position to adjust the emission angle of the light from the emission face to an emission angle corresponding to the eye point disposed closer to the upper of the vehicle or the eye box disposed closer to the upper of the vehicle, and controls, when the detection eye point corresponds to an eye point disposed closer to a lower of the vehicle than the eye point disposed at the reference position or the detection eye box corresponds to an eye box disposed closer to the lower of the vehicle than the eye box disposed at the reference position, the driving part to relatively move the field lens to a position closer to the upper of the vehicle than the reference lens position to adjust the emission angle of the light from the emission face to an emission angle corresponding to the eye point disposed closer to the lower of the vehicle or the eye box disposed closer to the lower of the vehicle.

* * * * *